United States Patent [19]
White, Jr. et al.

[11] Patent Number: 5,694,534
[45] Date of Patent: Dec. 2, 1997

[54] APPARATUS STORING A PRESENTATION OF TOPOLOGICAL STRUCTURES AND METHODS OF BUILDING AND SEARCHING THE REPRESENTATION

[75] Inventors: Marvin S. White, Jr., Palo Alto; George E. Loughmiller, Jr., Cupertino, both of Calif.

[73] Assignee: Etak, Inc., Menlo Park, Calif.

[21] Appl. No.: 766,646

[22] Filed: Dec. 13, 1996

Related U.S. Application Data

[63] Continuation of Ser. No. 599,446, Jan. 19, 1996, abandoned, which is a continuation of Ser. No. 455,827, Dec. 15, 1989, abandoned, which is a continuation of Ser. No. 319,810, Mar. 6, 1989, abandoned, which is a continuation of Ser. No. 140,881, Jan. 6, 1988, abandoned, which is a continuation of Ser. No. 759,036, Jul. 25, 1985, abandoned.

[51] Int. Cl.$^6$ ............................................. G06T 9/00
[52] U.S. Cl. ................................. 395/140; 395/133
[58] Field of Search ........................... 395/133, 140, 395/141, 121, 128; 364/449, 474.28, 603, 615; 340/988, 995

[56] References Cited

U.S. PATENT DOCUMENTS

| | | | |
|---|---|---|---|
| 4,343,037 | 8/1982 | Bolton | 364/521 |
| 4,360,876 | 11/1982 | Girault et al. | 364/521 X |
| 4,445,186 | 4/1984 | Caron et al. | 364/521 |
| 4,489,389 | 12/1984 | Beckwith et al. | 364/518 X |
| 4,511,975 | 4/1985 | Miura et al. | 364/521 X |

OTHER PUBLICATIONS

*Topological Principles in Cartography*, James P. Corbett, Technical Paper 48, U.S. Department of Commerce, Bureau of the Census, Dec. 1979.

"CARGuide—On–board Computer for Automobile Route Guidance," M. Sugie, O. Menzilcioglu, H.T. Kung, AFIPS Conference Proceedings, 1984 National Computer Conference.

"A Tiger for Tomorrow," Roland H. Moore, Joint Symposium for Urban Data Management Systems and the Spatially Oriented Referencing Systems Association, The Hague, Netherlands, Jun. 3, 1985.

"Two–Dimensional Closed Surface Model for Processing Geographical Information with a Computer," Mario Nakamori, Collection of Lecture Papers from the 19th National Conference, Information Processing Society of Japan, Aug. 22–24, 1978. (In Japanese, with English Translation provided.)

"Algorithm for Studying Topological Characteristics of a Complex in a Closed Surface and a Data Structure," Mario Nakamori, Collection of Lecture Papers in the National Conference of the Information Division of the Institute of Electronics and Communication Engineers, Aug. 1977. (In Japanese, with English Translation provided.)

*Primary Examiner*—Heather R. Herndon
*Assistant Examiner*—Stephen Hong
*Attorney, Agent, or Firm*—Fliesler, Dubb, Meyer & Lovejoy LLP

[57] ABSTRACT

A data storage medium storing a representation of a topological structure having topological features, on which is stored a digital data base including a plurality of carrier blocks of data representing the topological features t a given level of detail, each one of the carrier blocks being a representation of a carrier which is a closed set containing in its interior a given topological object. Also disclosed are methods for building the carrier blocks, for building a hierarchy of carrier blocks, and for searching the digital data base at all hierarchical levels.

20 Claims, 16 Drawing Sheets

TOPOLOGICALLY EQUIVALENT

TOPOLOGICALLY DIFFERENT

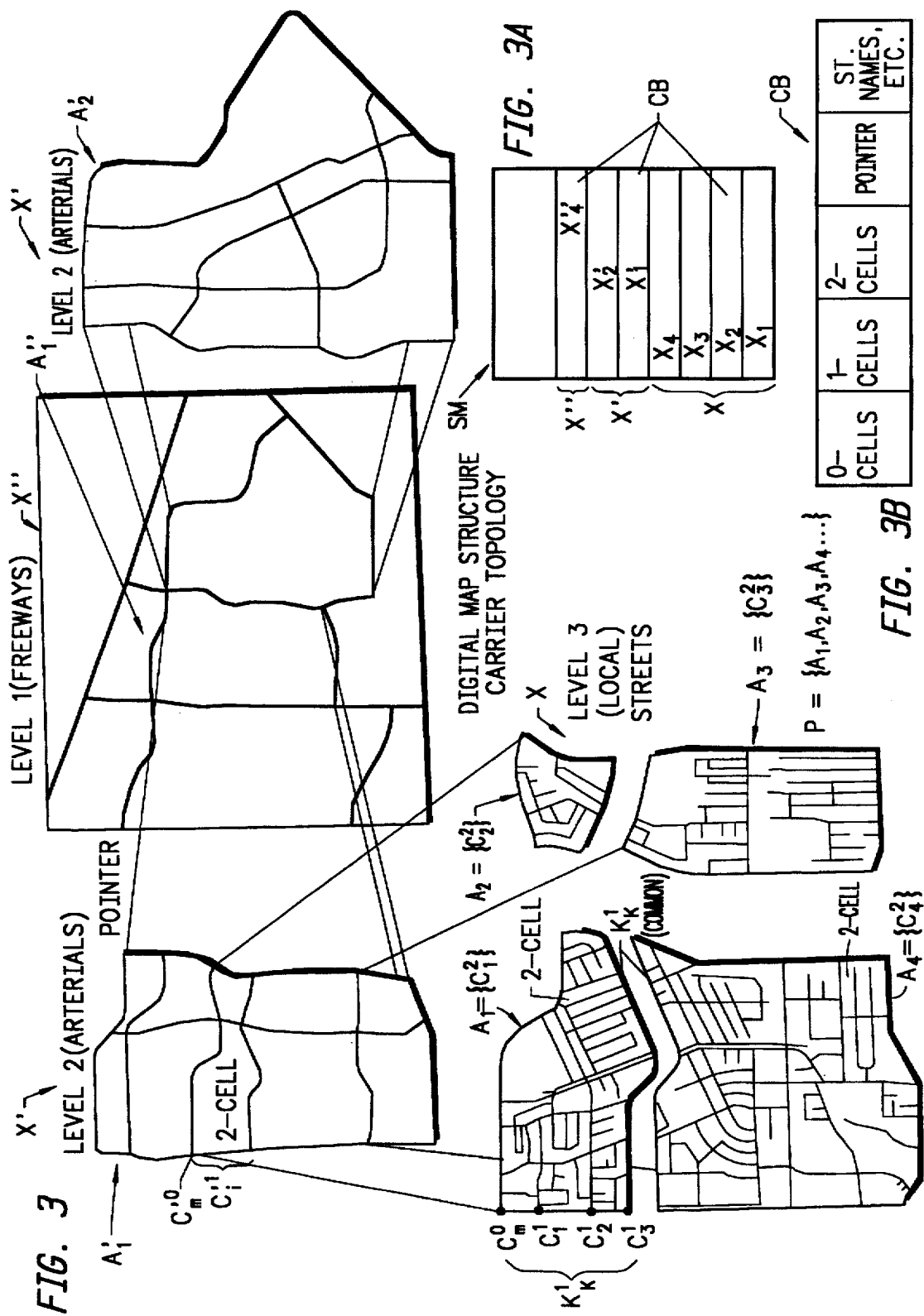

| GBF/DIME CODING FORM | | | | | | |
|---|---|---|---|---|---|---|
| STREET NAME | FROM NODE | TO NODE | LEFT BLOCK | RIGHT BLOCK | LEFT ADDRESSES | RIGHT ADDRESSES |
| OAK AV. | 11 | 10 | 305 | 302 | 301-305 | 300-306 |
| OAK AV. | 10 | 4 | 305 | 301 | 307-315 | 308-318 |
| URVE ST. | 10 | 9 | 301 | 302 | – | – |
| URVE ST. | 9 | 8 | 301 | 302 | 1-9 | 2-10 |
| CURVE ST. | 8 | 7 | 301 | 302 | – | – |
| MAIN ST. | 13 | 6 | 205 | 202 | 301-315 | 300-314 |
| PINE ST. | 12 | 7 | 302 | 205 | 301-309 | 300-304 |
| PINE ST. | 7 | 5 | 301 | 205 | 311-315 | 306-314 |
| ELM ST. | 4 | 5 | 107 | 301 | 145-179 | 144-178 |
| ELM ST. | | | | | | |
| MAPLE ST. | 11 | 12 | 302 | 303 | 147-163 | 146-164 |
| MAPLE ST. | 12 | 13 | 205 | 204 | 201-209 | 200-208 |

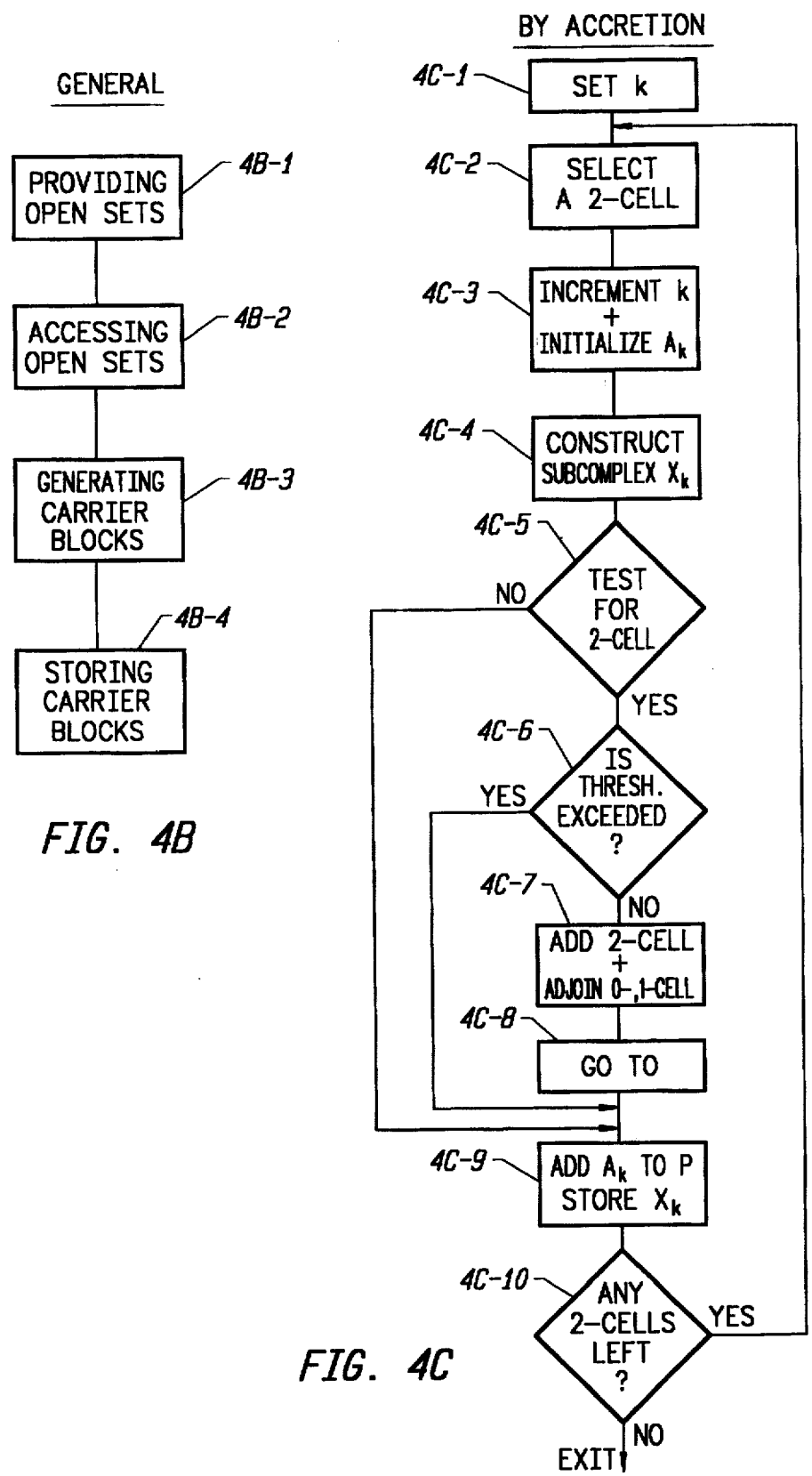

NEXT LEVEL

GENERAL

SPECIFIC

APPARATUS STORING A PRESENTATION OF TOPOLOGICAL STRUCTURES AND METHODS OF BUILDING AND SEARCHING THE REPRESENTATION

This application is a Continuation of Ser. No. 08/599,446, filed Jan. 19, 1996, now abandoned, which is a Continuation of Ser. No. 07/455,827, filed Dec. 15, 1989, now abandoned, which is a Continuation of Ser. No. 07/319,810, filed Mar. 6, 1989, now abandoned, which is Continuation of Ser. No. 07/140,881, filed Jan. 6, 1988, now abandoned, which is a continuation of Ser. No. 06/759,036, filed Jul. 25, 1985, now abandoned.

BACKGROUND OF THE INVENTION

1. Field of the Invention

The present invention relates generally to apparatus storing a representation of topological structures and methods of building and searching the representation. More particularly, the present invention relates to the storage of, and methods of building and searching, data bases representing topological structures, including geometric structures, for effectively processing the data and presenting the data, such as on a display.

2. Background Art

Representations of a wide variety of topological structures, including geometric structures, are used for many purposes, such as to convey information. These representations include maps of geographical areas, layouts and masks of integrated circuits, mechanical drawings, and other geometric representations. In this age of computer technology, these representations typically are provided in the form of digital data bases that are stored in memory and processed by a computer for a variety of purposes. One purpose may be to read out the information on, for example, a display. Another purpose might be to update the digital data base in view of changes that are made to the underlying geometric structure. For example, if a new street is added to a neighborhood, the corresponding digital data base portion of the map stored in memory should be updated to include that street.

Moreover, in a given computer system, the amount of memory that is available for the storage of data usually is limited. Accordingly, it is advantageous to store efficiently a representation of a given geometric structure so as to minimize the memory occupied by the digital data base. Furthermore, it may be important to access quickly and in sequence portions of the digital data base so as to be able to properly display part of the geometric structure. For example, in two co-pending patent applications, Ser. No. 06/618,041, now U.S. Pat. No. 4,796,191, filed Jun. 7, 1984 and Ser. No. 06/663,862, now U.S. Pat. No. 4,914,605, filed Oct. 22, 1984, and assigned to the assignee of the present invention, a computerized vehicle navigation system and moving map display are disclosed, respectively. The on-board computer of the vehicle calculates the position of the vehicle and accesses the digital map data base to show to the driver the vehicle position via a display of a map. As the vehicle moves, its position on the map changes and the area of displayed map changes.

In order to accomplish all of the above, the entire representation of a given topological or geometric structure should be divided into small pieces, so that the corresponding digital data base portions stored in memory can be effectively processed or displayed. In one prior technique, a digital data base is produced and stored by first providing an electronic grid overlay of equal-sized grid cells on the representation, such as the map. Each cell of the grid overlay is then optically scanned and the resulting data digitized and stored at a given location in memory as a block of data.

One problem with the above grid overlay approach is that the memory space is inefficiently utilized. The reason for this is that a given cell of the grid may overlay a detailed street network while another cell of the grid may overlay no street network or a much less detailed street network. Yet, the same memory space as used for the former is still allocated to the latter even though there is little or no map information underlying that particular cell.

Another problem is that a given street or other map feature may cut across the boundary or boundaries of two or more mutually adjacent cells. A consequence of this is that one or more of three disadvantageous compromises must be made to properly store such a feature. Either the feature must be split at the cell boundary or boundaries, which may not occur at natural features like a street intersection, thereby having to store the same feature in two or more blocks of data, or the feature must be referenced or indexed in the digital map data base more than once, i.e., once for each cell it crosses, thereby requiring more memory space for the index and greater access time to the feature since the index and separate blocks of data must be accessed once for each such cell. Alternatively, the index can allocate the feature to only one of the cells and not the others that are crossed, but this reduces the accuracy of the index.

Another approach to creating and storing the digital data base is known as the "quad tree" technique. In this approach, the map, for example, is overlayed with an electronic grid that divides the map initially into quarter sections or cells. Then, each initial quarter cell that overlays a detailed street network is itself further divided into quarter cells, and so on. An initial quarter cell that does not overlay much street detail and, therefore, has relatively little geographic information, is not further divided. In other words, the size of the grid cell is adapted or altered depending on the amount of data it overlays. After the digitizing and storing, the result is that less memory storage space is utilized for those quarter cells that overlay sections of the map having little detail and more storage space is available for the scanned areas having more detail.

While the quad tree technique has the advantage of a more efficient utilization of memory space than the technique described above using a grid overlay of equal-sized cells, it still suffers from the above-described problem relating to a given feature crossing two or more mutually adjacent cell boundaries. Analogous methods use hexagonal and triangular grid cells, but these essentially are not different from the quad tree grid overlay.

Moreover, and as will be described more fully below, the grid cells of any of the above techniques are not "closed topological cells", as this term is known in the art of cartography. In other words, the resulting digital data base does not have topological information about the underlying geometric structure. This lack of information has certain disadvantages including, for example, the inability to retrieve the network of streets for what is known as "minimum path finding".

Another approach to creating and storing the data base is known as DIME (an acronym for Dual Incidence Matrix Encoding). In this approach, an example of which is described and illustrated more fully below, the map, for example, is represented topologically using topological "open" "n-cells". Each DIME computer record corresponds to a single line segment in the map and information is recorded about the endpoints of the line segment and the areas to the left and right of that line segment. One disadvantage is that DIME data bases typically are organized by street names, which is inefficient because this requires considerable memory space.

Furthermore, while DIME has the advantage of storing topological information, its data base organization is inefficient for retrieval purposes. Each line segment retrieved by the computer from the DIME data base may require an I/O (input/output) operation, which is relatively time consuming. In other words, a DIME data base is not organized in a manner that enables it to be relatively quickly accessed so as to, for example, effectively display a moving map. Thus, in the example of a moving map display in a vehicle, one I/O operation per street segment would be far too slow, because the vehicle could be driven faster than the map data could be retrieved to display the corresponding street segment, thereby making the map useless for navigation.

Another problem indicated above with the prior techniques is that a separate digital index must be stored and accessed in memory to enable the computer to access a desired portion of the digital data base. For example, in using a DIME data base, in which the data of the line segments are stored as coordinates of the line segment endpoints, additional indices are required to be stored to access the portion of the data base that represents street segments within, for example, a given range such as a rectangular window. This has the disadvantage of utilizing additional storage space in the memory to store the index.

SUMMARY OF THE INVENTION

In one aspect the present invention constitutes apparatus storing a representation of a topological structure having topological features, including a data storage medium, and a digital data base stored on the data storage medium, the digital data base including a plurality of carrier blocks of data representing the topological features at a given level of detail, the data of each one of the carrier blocks being a representation of a carrier which is the smallest topological closed set including in the interior thereof a given topological object.

In another aspect, the invention constitutes a method of building a digital data base, representing a given topological having topological features, using a programmed computer, the digital data base including a plurality of carrier blocks of data representing the topological features at a given level of detail, the data of each one of the carrier blocks being a representation of a carrier which is the smallest topological closed set including in the interior thereof a given topological object, comprising the steps of:

a) providing on a data storage medium a stored digital data base representing a topological structure having a partition P of topological open sets;

b) accessing the topological open sets of the partition P;

c) generating from the accessed topological open sets the plurality of carrier blocks; and d) storing the plurality of carrier blocks on a data storage medium.

In yet another aspect, the invention constitutes a method of building a more generalized or less detailed topological complex X' from a plurality of carrier blocks of data representing a more detailed topological complex X, using a programmed computer, wherein the data of each of the carrier blocks represents a topological closed set of n-cells, and wherein said plurality of carrier blocks include data representing mutually-adjacent boundaries as n-cells and interiors thereof as n-cells, comprising the steps of:

a) providing said plurality of carrier blocks of data as a digital data base on a data storage medium;

b) accessing said plurality of carrier blocks on said digital data base;

c) generating from said accessed plurality of carrier blocks at least one other carrier block of data corresponding to said complex X', said other carrier block of data representing a topological closed set which is topologically equivalent to said data of said plurality of carrier blocks, and wherein said n-cells of said common boundary and said n-cells of said interior are absorbed in said other carrier block; and d) storing said other carrier block on a data storage medium.

In order to create additional levels in the hierarchy, another computer program described below is executed and iterates the above-described program to create a a still less detailed complex X" from the complex X', and so on. Embodiments of these two program are given below and called, respectively, NEXT LEVEL and HIERARCHY.

In still another aspect, the invention relates to three different methods for searching the digital data base having a hierarchy of carrier blocks of data, the carrier blocks at each level in the hierarchy constituting topological complexes X, X', X" . . . , each of the complexes containing successively more generalized information and the complex containing the most generalized information being the root, and each of the complexes having n-cells, where n=0, 1, 2 . . . The three different search algorithms are called, respectively, TOP-DOWN, ACROSS and BOTTOM-UP. For example, in a structure where n=2, TOP-DOWN comprises the steps of:

a) initializing a first list of selected cells and a second list of current carrier blocks;

b) setting the second list of current carrier blocks to be the root;

c) setting the current hierarchical level to be the root;

d) selecting from the second list of carrier blocks, the 0-cells, 1-cells, and 2-cells that fall within a specified range from a point;

e) exiting if the current hierarchical level is the most detailed level;

f) replacing the second list of current carrier blocks with another list containing one carrier block for each 2-cell at the current level in the first list of selected cells, the one carrier block of said other list being at the next level of the hierarchy;

g) incrementing the current level; and h) returning to step d).

BRIEF DESCRIPTION OF THE DRAWINGS

FIG. 3 illustrates pictorially digital map structure carrier topology used to explain partitioning by carriers and a hierarchy of carriers in accordance with the principles of the present invention.

FIGS. 3A and 3B show carrier blocks and the data contained in carrier blocks, respectively.

FIGS. 3C-1 and 3C-2 illustrate pictorially a given arbitrary geometric structure and a carrier for the geometric structure, respectively.

FIGS. 4A-1 and 4A-2 are pictorial illustrations of an example of a DIME digital data base of a topological complex X used to explain the flow charts of FIGS. 4B and 4C.

FIGS. 4B and 4C are flow charts of embodiments of a computer program used for building carrier blocks.

DETAILED DESCRIPTION OF THE INVENTION

The present invention applies generally to topological representations, including geometric representations, of any kind, including maps, mechanical drawings, and integrated circuit masks or layouts. The invention will be described in particular to maps and digital map data bases. Also, while the invention will be described and claimed in relation to "digital" data bases, it also applies to data bases that are "analog" and to analog computers which process analog data bases.

I. Overview of Known Mathematical Combinatorial Topology

Figure 1:
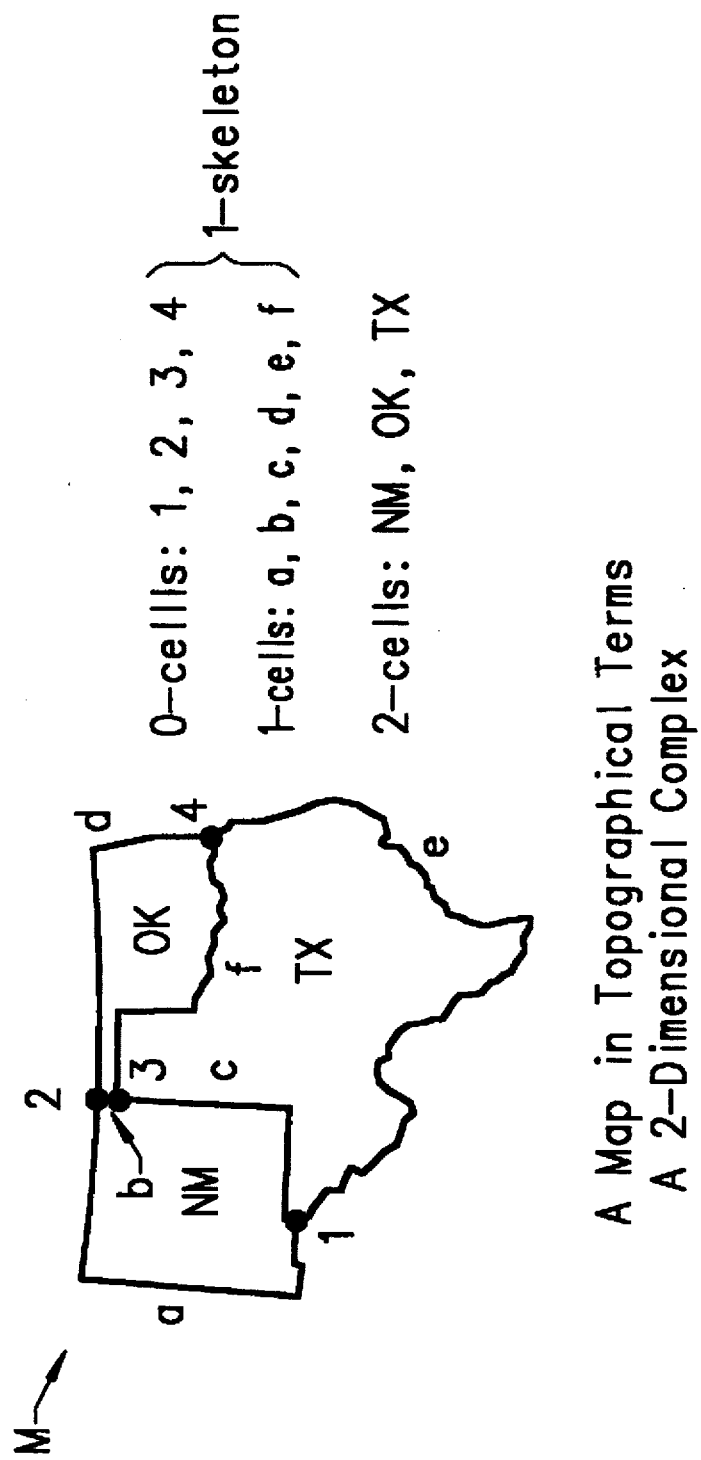
FIG. 1 is a representation of a geometric structure, particularly a map, used to explain combinatorial topology.

In order to understand the present invention, and to provide nomenclature, an overview of certain mathematical theory, known as combinatorial topology, will be given. Reference will be made to 2-dimensional geometric structures, such as maps, but, the principles apply to 3-dimensional and higher-dimensional geometric structures as well. Reference also will be made to FIG. 1 which illustrates a map M of three states, New Mexico, Oklahoma and Texas, and to FIGS. 2A and 2B which illustrate the topological principles of fusion.

The fundamental objects for 2-dimensional geometric structures in combinatorial topology are 0-cells, 1-cells, and 2-cells. In general, an n-cell is a connected, n-dimensional geometric object. Thus, as shown in FIG. 1, a 0-cell is a point, a 1-cell is an open line segment of any shape not intersecting itself or any other n-cell, and a 2-cell is an "open" disc stretched and formed to any shape not intersecting itself or any other n-cell. The term "open" has a certain topological meaning. That is, a 2-cell is open if its boundary of 0-cells and 1-cells is not included and would be closed if its boundary were included. For purposes of describing the present invention, the 2-cell is considered to be an open cell, although in mathematical literature the usage may vary. Accordingly, for example, as shown in FIG. 1, the map M shows four 0-cells labeled 1–4, respectively, five 1-cells labeled a–f, respectively, and three 2-cells (open discs) referenced NM (New Mexico), OK (Oklahoma) and TX (Texas).

A given n-cell will be denoted by $c^n_i$, where the superscript n gives the cell dimension and the subscript i selects from a set of cells $\{c^n_i\}$.

Furthermore, a 2-dimensional complex X or "2-complex" is a collection of 0-, 1-, and 2-cells formed according to the following set of three recursive rules:

1) A 0-dimensional complex or "0-complex" is a collection of 0-cells.

2) A 1-dimensional complex or "1-complex" includes a 0-complex (also known as the 0-skeleton), together with a set of 1-cells satisfying the conditions that (a) each 1-cell is bounded in the 0-complex, and each 0-cell of the complex is on the boundary of some 1-cell of the 1-complex. Thus, for example, the 1-cell labeled d in FIG. 1 is bounded by the 0-complex of 0-cells labeled 2 and 4 and each such 0-cell is on the boundary of this 1-cell.

3) A 2-complex includes a 1-complex (also known as a 1-skeleton), together with a collection of 2-cells satisfying the conditions that (a) each 2-cell is bounded in the 1-complex and each 1-cell of the complex is on the boundary of some 2-cell of the 2-complex. Thus, for example, the 2-cell labeled OK (Oklahoma) is bounded in the 1-cells labeled b, d and f, and each such 1-cell is on the boundary of the 2-cell labeled OK.

Thus, the 2-complex is similar to a jigsaw puzzle whose pieces are the above-described fundamental topological objects, i.e., n-cells, where n is the dimension. Similar definitions can be made for complexes of any dimension, such as a 3-dimensional complex which would have 0-, 1-, 2-, and 3-cells. A practical example of a 2-complex is a DIME data base representing, for example, a street map of a city, as will be described below in relation to FIGS. 4A-1 and 4A-2.

A 2-dimensional complex may be embedded in a 3-dimensional space. For example, a map sheet is a 2-dimensional and a complex representing it is 2-dimensional, but each point may have x, y and z coordinates as for an elevation map. The dimensionality of the map does not limit the number of coordinates.

A "sub-complex" is a subset of the 0-, 1-, and 2-cells that satisfies the conditions for a complex. Thus, the 1-skeleton of a 2-complex is an example of a sub-complex. Also, the closure of a set of 2-cells, which is a set of 2-cells, the 1-cells bounding any of the 2-cells, and the 0-cells bounding any of those 1-cells, is a sub-complex. For example, with reference to FIG. 1, a closed set would include the 2-cell TX, the 1-cells c, e, f and the 0-cells 1, 3, 4.

A "carrier" also is a mathematical term used in topology, and this will be defined and explained in more detail below in relation to FIGS. 3C-1 and 3C-2.

A linear combination of n-cells of the same dimension is called a "chain" and is denoted by:

$$K^n = \Sigma c^n_i$$

Figure 2A:
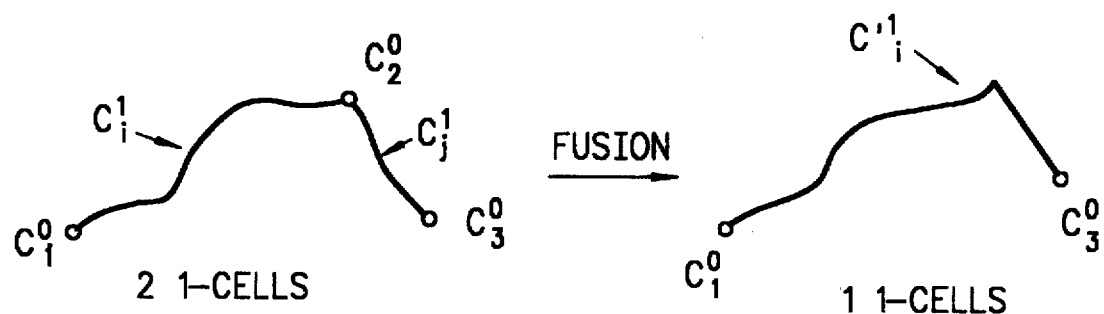
FIG. 2A illustrates pictorially the technique of fusion that may be used on topological 1-cells in accordance with the present invention.
Figure 2B:
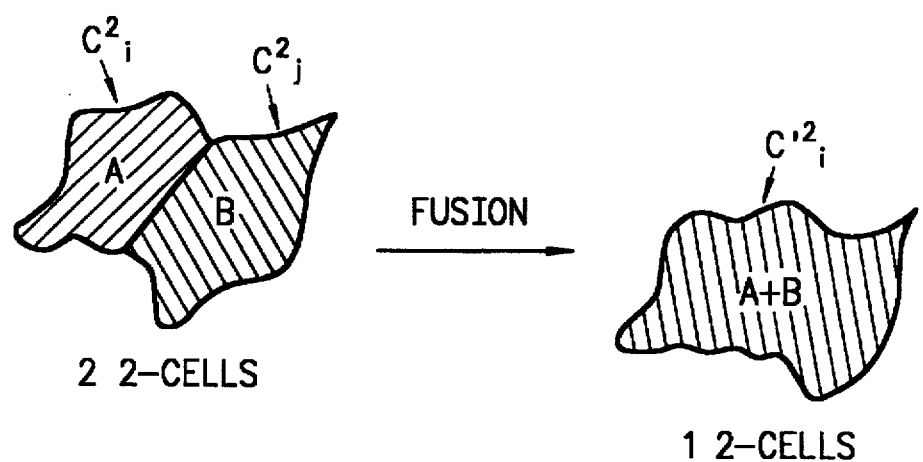
FIG. 2B shows pictorially the technique of fusion that may be used on topological 2-cells in accordance with the present invention.

FIGS. 2A and 2B illustrate the topological principle of fusion. As illustrated in FIG. 2A, a pair of 1-cells, $c^1_i$ and $c^1_j$, may be "fused" to form a single 1-cell $c'^1_i$ if the pair of cells share a common 0-cell, i.e., if they are adjacent. FIG. 2A shows the common 0-cell $c^0_2$. Likewise, as shown in FIG. 2B, a pair of adjacent 2-cells $c^2_i$ and $c^2_j$ may be fused to form a chain or single 2-cell $c'^2_i$. Fusion, which will also be described in more detail in relation to FIG. 3, preserves the topological characteristics of the complex, so that the complex after fusion is "topologically equivalent" to the complex prior to fusion.

Figure 2C:
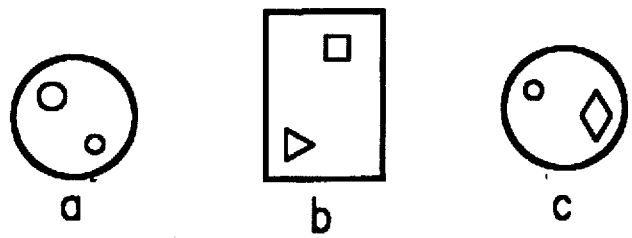
FIGS. 2C and 2D are used to illustrate the principles of "topological equivalence" and "topological difference" respectively.
Figure 2D:
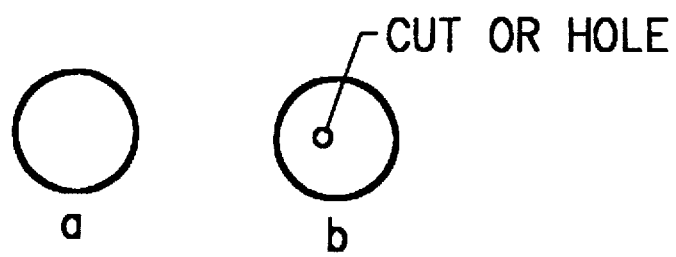

Reference will now be made to FIGS. 2C nd 2D to explain more fully complexes which are "topologically equivalent" or "topologically different". A topological transformation is a continuous deformation, intuitively a rubber sheet transformation, where neither rips nor folds are permitted. A precise definition of topological equivalence in terms of mappings and continuity can be found in any text on topology, but the intuitive idea will suffice here. The three items in FIG. 2C are topologically equivalent but the two items a, b in FIG. 2D are not, because a cut must be made in the interior of item a to deform it into item b. Conversely, the points on the boundary of the hold in item b must coalesce into a single item point (a singularity) to transform item b into item a. This would also violate the requirements for topological equivalence.

Furthermore, chains of adjacent 1-cells can be fused into a single 1-cell, and chains of adjacent 2-cells can be fused to create a single larger 2-cell, both by iterating pairwise fusion of the adjacent n-cells as given above. Thus, for example, while not shown, the chain $c'^1_i$ shown in FIG. 2A and the chain $c'^2_i$ shown in FIG. 2B can be fused, respectively, with similar adjacent chains to create a still single larger 1-cell or 2-cell, respectively.

In summary, the fusion operation converts a given complex X into another topologically equivalent complex X':

Fuse: $X \rightarrow X'$

As will be described more fully below in relation to FIG. 3, while the original unfused n-cells and the fused chain of n-cells are topologically equivalent, they are not the same thing, although they both represent the same region or area of the geometric structure, i.e., the map M in the example. The unfused n-cells, such as the unfused 2-cells shown in FIG. 2B, represent the geometric region in finer detail than the fused n-cell, i.e., the 2-cell $c'^2_i$ shown in FIG. 2B, which represents the geometric region as a single atomic entity.

II. Partitioning By Carriers In Accordance With the Present Invention; Index; Hierarchy of Carrier Blocks; Summary A. Carriers Reference now will be made to FIG. 3 to explain the principles of the present invention. These include, among other principles, partitioning a representation of a topological structure, e.g. a geometric structure such as the map M, by "carriers" as described below, as opposed, for example, to partitioning the map M by using a grid overlay or by partitioning the map M using street names and topological open n-cells as DIME does. That is, the present invention organizes data into a data base by "carriers".

FIG. 3 shows a digital map structure carrier topology of the present invention at, for example, three hierarchical levels 1–3. While only three such levels 1–3 are shown and will be described, the principles of the present invention apply to any number of levels. As will be further described as one example, at level 3 there is a complex X which may have some of its n-cells fused to create a complex X' of level 2 which, in turn, may have some of its n-cells fused to create a complex X" of level 1.

Accordingly, consider a partition P (at a given level) of the set of 2-cells $c^2_j$:

$P = \{A_1, A_2, \ldots A_i\}$, where $A_i$ is an element of the partition P, and $A_i = \{c^2_j\}$, such that the 2-cells $c^2_j$ are mutually adjacent.

Thus, for example, at level 3 shown in FIG. 3, the partition P includes elements $A_1$–$A_4$, each having a set of mutually adjacent 2-cells $c^2_j$. At level 2, the partition P includes two elements $A'_1$ and $A'_2$.

For each of the elements $A_i$ of the partition P at a given level 1–3, in accordance with the present invention a sub-complex $X_i$ is constructed having the 2-cells $c^2_j$ in $A_i$, all 1-cells $c^1_j$ incident to those 2-cells $c^2_j$, and all 0-cells $c^0_j$ incident to the 1-cells $c^1_j$. The sub-complex $X_i$ thus represents a carrier which is a topological closed set and the collection $\{X_i: A_i \text{ in } P\}$ at a given respective level 1–3 covers the entire complex X.

Furthermore, the interior of sub-complex $X_i$ is disjoint from the interior of sub-complex $X_j$ for j not equal to i, the advantages of which are related, for example, to map editing described below. However, although such interiors are disjoint, mutually adjacent sub-complexes $X_i$ and $X_j$ have a chain of 1-cells $K^1_k$ on their common boundary. That is, the same chain of 1-cells $K^1_k$ occurs in both sub-complexes $X_i$ and $X_j$. For example, the sub-complex $X_1$ corresponding to element $A_1$ and the sub-complex $X_4$ corresponding to element $A_4$ of level 1 have a common chain $K^1_k$ at their common border, as shown in FIG. 3.

Each such sub-complex $X_i$, in accordance with the present invention, is said to "carry" a subset of the 0-, 1-, and 2-cells in its interior and accordingly is called herein the "carrier" for such a subset. The digital representation of each carrier is called herein a "carrier block", because it is stored as a single block of data in memory. For example, FIG. 3A shows a data storage memory SM having groups of carrier blocks CB corresponding to a given level 1–3. Each carrier block CB has a block of digital data representing the corresponding sub-complex $X_i$ at the given level.

Thus, as shown in FIG. 3B, the stored data of a given carrier block CB are 0-cells (as XY coordinate data), and 1-cells and 2-cells (shape information such as DIME encodes 1-cells and 2-cells). In addition, and as will be further described regarding the INDEX feature of the present invention, the given carrier block CB may store a pointer to a carrier block CB of another hierarchical level, so that, for example, the carrier block CB for sub-complex $X_1$ of level 3 of complex X will have a pointer to the sub-complex $X'_1$ of level 2 of complex X'. Also as shown in FIG. 3B, the given carrier block CB may include street names and other information that street names and such other information in addition to streets of the map M may be, for example, displayed.

As previously described, and as will be further described below in Section IIC (HIERARCHY) a chain of 2-cells $c^2_j$ may be constructed, and to avoid proliferation of notation, the chain is denoted by $A_i$ as well:

$A_i = \Sigma c^2_j$.

Because the 2-cells $c^2_j$ of an element $A_i$ are mutually adjacent, this chain can be fused together to form a single 2-cell $c'^2_i$. Thus, for example, and as will be further described below, the chain of 2-cells $c^2_j$ of each respective element $A_1$–$A_4$, is fused into a respective single 2-cell of the complex X' of level 2, as shown.

Thus, regarding the partition P at a given level as a set of elements $A_i$ or chains of 2-cells, and as will be further described below, n-cells of the complex X can be fused to create the topologically equivalent complex X', as follows:

For each element $A_i$ in the partition P:

1) $A_i \rightarrow c'^2_i$; that is the chain of 2-cells is fused into one 2-cell, such as $\{c^2_3\}$ at level 3 being fused into $c'^2_3$ at level 2 as pictorially shown in FIG. 3.

2) The boundary of sub-complex $X_i \rightarrow$ a set of chains of 1-cells $\{K^1_i\}$, where each of the chains is a chain of adjacent 1-cells along the common boundary of a pair of adjacent sub-complexes $X_i$ or along the boundary of the entire complex X.

3) $K^1_k \rightarrow c'^1_k$, where each of the $c'^1_k$ is a single 1-cell corresponding to a chain of 1-cells $K^1_k$. For example FIG. 3 shows a chain of 1-cells $K^1_k$ labeled $c^1_1$, $c^1_2$, $c^1_3$ on the boundary of element $A_1$, which is fused into the single 1-cell $c'^1_1$ of element $A'_1$ of the complex X'.

4) $c^0_m \rightarrow c'^0_m$, where $c^0_m$ is a 0-cell on the boundary of at least one of the chains $K^1_k$, as shown in FIG. 3.

The complex X' comprises the resulting cells $c'^2_i$, $c'^1_k$, $c'^0_m$ and necessarily has fewer n-cells than the complex X (provided the partition P is not the maximal partition P in which element $A_i$ contains exactly one 2-cell for every i). By means of this mapping, a simpler cellular decomposition of the 2-dimensional space may be constructed and stored on storage memory SM; viewed in reverse, the original complex X is a more detailed complex of the complex X'. By choosing the partition P to be significant, e.g., along major roadways for a map, complex X' represents the geometric space at that level of significance.

By replacing 2-cells with 3-cells and extending the fusion of 1- chains to 2-chains, the principle of carriers of the present invention applies to 3-dimensional structures.

Figures 1, 3C:
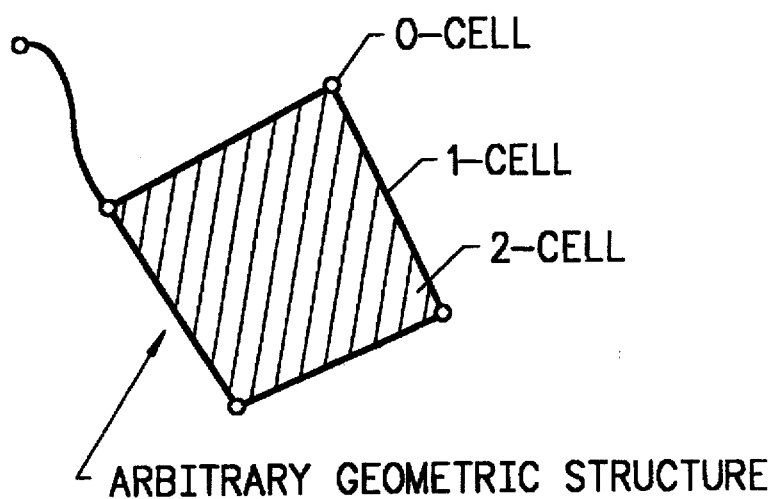
Figures 2, 3C:
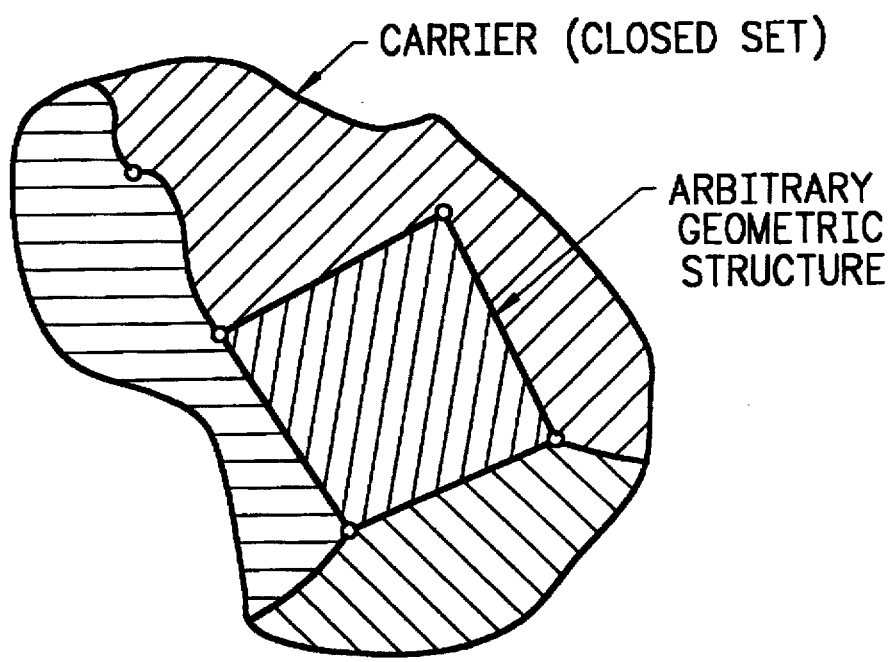

In general, and with reference to FIGS. 3C-1 and 3C-2, a carrier of a given set or topological object may be defined as the topological closed set, e.g., the smallest topological closed set, containing the given set or topological object in its interior. This means that none of the given set may have any part on the boundary of the carrier; rather, all of the given set must be contained within the carrier. More specifically, FIG. 3C-1 shows an arbitrary geometric structure as such a given set, which structure has 0-cells, 1-cells and 2-cells. FIG. 3C-2 shows the carrier for that given set, which carrier is the smallest topological closed set containing the given set and corresponds to a given sub-complex $X_i$ stored as a carrier block CB.

Thus, the carrier contains all n-cells that could be affected by any continuous process on the given set. For example, and as will be further described below, one use of carriers is to gather or organize together all data that represents geographic areas to which a continuously moving vehicle could travel from a given known position, as described in the above-mentioned co-pending applications. As the vehicle moves, carrier blocks stored in memory are accessed to display the given sets as a moving map.

As was indicated in Section I above, carriers are also mathematical tools used by mathematicians for different purposes, e.g., to analyze continuous functions.

B. Index

As will be further described, the correspondence of n-cells and chains in the mapping or fusing relates the more significant features to collections of less significant features, which constitutes the search index of the present invention used for searching the digital data base of carrier blocks CB. In other words, and as was indicated above in relation to FIG. 3B, for example, the element $A''_1$ of the partition P of level 1, which has freeways as the most significant feature, is an index or pointer to the element $A'_1$ of the partition P of level 2, which has arterial roadways as a lesser significant feature, which itself is an index or pointer to the elements $A_1$–$A_4$ of the partition P of level 3, which has local streets as the least significant feature.

It should be noted that the quad tree approach to partitioning a map M also has an hierarchical index, but the several levels are not useful topological structures.

C. Hierarchy of Carrier Blocks

As illustrated pictorially in FIG. 3 and indicated in IIA above, the carrier building process can be iterated to construct still simpler cellular decompositions:

$$X \rightarrow X''$$

$$X'' \rightarrow X'''$$

The result is an hierarchy of 2-complexes. An arbitrary 2-cell $c^2_i$ in the original complex (the most detailed such as complex X in FIG. 3) is contained in a nested hierarchy of 2-cells, one from each complex in the hierarchy of complexes. Likewise, each sub-complex $X_i$ is contained in a nested hierarchy of sub-complexes and each of these represents a topological closed set. These facts are the basis for the digital data base search algorithms disclosed below. This hierarchy applies without alteration to higher dimensional spaces.

D. Summary

In summary, FIG. 3 shows a roadmap at three scales or levels, each having corresponding groups of carrier blocks CB, (level 3) large—showing all the local streets, (level 2) intermediate—showing only major streets, e.g., arterials, and (level 1) small, showing only limited access highways, e.g., freeways. The exact correspondence between the levels is also indicated in the figure. The chain $K^1_i$ of 1-cells ($c^1_1$, $c^1_2$, $c_{1c}$) at level 3 corresponds to the single 1-cell $c'^1_A$ at level 2. Thus, level 2 contains less information than level 3, because a chain of 1-cells is fused to a single 1-cell at level 2, and 1-cells interior to the sub-complexes $X_i$ are effectively absorbed into the 2-cell $c'^2_i$ of level 2. (A further reduction in information can be made by filtering the detailed shape of the chain of 1-cells to produce a more generalized representation. This reduces the amount of data that are stored in the carrier block to represent the chain.)

Also, just as chains of 1-cells are fused into single 1-cells and their geometric representation may be further generalized in the mapping through filtering, chains of 2-cells are fused into single 2-cells and their geometric description (for example elevation contours) may be filtered to a still more generalized representation.

Single 0-cells map into single 0-cells or are absorbed within chains of 1-cells that map to single 1-cells going to the next level of generalization. The 0-cells bounding the chains of 1-cells map to 0-cells and the 0-cells interior to the chain are dropped in the mapping. Similarly, 1-chains on the boundary of the sub-complexes $X_i$ map into 1-cells in $X'_i$, but 1-cells interior of the carriers are absorbed in the fusion of 2-cells. In this way, the number of n-cells diminishes in the mapping.

Thus, the mapping from one level to the next reduces information and consequently the next level covers a larger geographical region (in the case of maps) with substantially the same amount of data in the respective carrier blocks CB. In FIG. 3, all of the illustrated elements $A_1$–$A_4$ of level 3 map into a single element $A'_1$ of the level 2 representation. Likewise, both of the elements $A'_1$ and $A'_2$ of level 2 map into the single element $A_1$ of level 1.

III. Building Carrier Blocks and Their Hierarchy

A. Introduction

In Section II, carriers, carrier blocks CB and their hierarchy were described. Ultimately, and as will be further described below, a data storage medium SM (see FIG. 3A) will store the carrier blocks CB, which may then be processed by a computer so as, for example, to display the geometric structure, e.g., the map M, at any level (such as levels 1–3 of FIG. 3) or update the representation, such as when new roadways are added, at any level. In this Section III, one embodiment of the manner in which the digital data base of carrier blocks CB, and their hierarchy, may be built will be described.

B. Building Carrier Blocks: In General: By Accretion

1. General

Figures 1, 2, 4A:
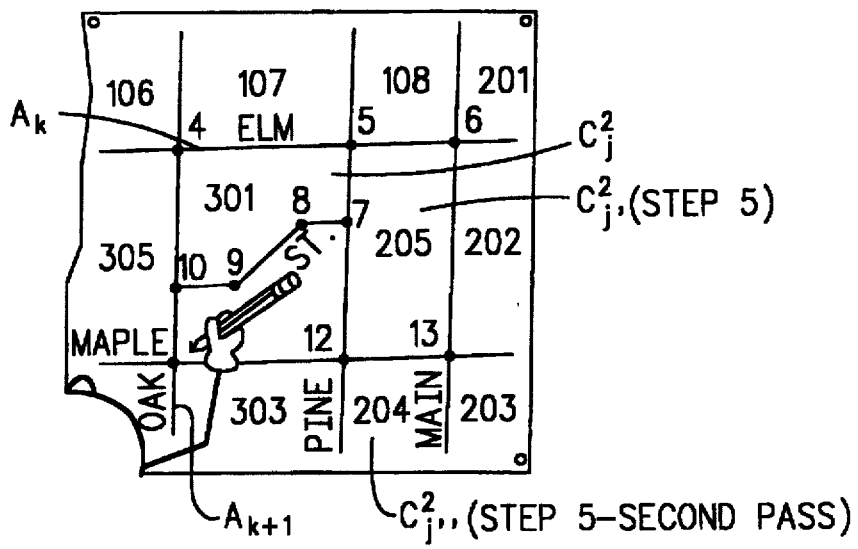

In general, the carrier blocks CB corresponding to the most detailed level, e.g., level 3 shown in FIG. 3, is constructed from a complex X of topological open sets of 2-cells. For example, and as previously described, the commercially available DIME map data base of a given geometrical area, which may be purchased from the U.S. Census Bureau, can be used as the complex X of input data for the method described below. This DIME map data base is pictorially illustrated in FIGS. 4A-1 and 4A-2 as having the set of topological open 2-cells $c^2_j$ stored in a computer data bank DB. FIG. 4A-2 indicates the DIME data base as being stored or organized by street names (see leftmost column). Also stored in the data bank DB as part of the DIME map data base are the 0-cells and 1-cells associated with, i.e., incident to, each one of the topological open cells $c^2_j$. The DIME data base can be stored on, for example, a relatively large computer such as the VAX 11/750 manufactured by Digital Equipment Corporation, Maynard, Mass.

Accordingly, and with reference to the software flow chart of FIG. 4B, the method broadly includes using a programmed computer in the following manner:

1) Providing on a data storage medium of a computer a stored digital data base representing a topological structure having a partition P of topological open sets of n-cells (such as the above-mentioned DIME data base) (block 4B-1).

2) Accessing the topological open sets of the partition P on the data storage medium (block 4B-2).

3) Generating from the accessed topological open sets the plurality of carrier blocks CB at a given hierarchical level (block 4B-3).

4) Storing the generated carrier blocks CB as a digital data base on a storage medium (block 4B-4).

2. By Accretion

In this specific procedure, the partition P at the most detailed level, e.g., level 3 shown in FIG. 3, is constructed element-by-element $A_i$ and at the same time the sub-complexes $X_i$ are constructed. Each of the elements $A_i$ of the partition P at such level is built by accretion, until given thresholds are reached, according to the following software algorithm which will be described in relation to FIG. 4A-1 and the flow chart of FIG. 4C:

In referring to FIG. 4A-1 again, it is assumed that the complex X of the given partition P has been generated and stored. In the current example, the complex X is the DIME data base described in IIIB1 above. Accordingly, the carrier blocks CB at a given level 1–3 are built and stored, as follows:

1) Initialize or set a counter k=0 (block 4C-1) (the counter k represents the subscript i in the element $A_i$ of partition P).

2) Select an arbitrary 2-cell in the complex X of data bank DB (block 4C-2) not already included in some prior element $A_i$ in P; call it $c^2_j$ (see FIG. 4A-1). This selection can be accomplished by setting a pointer to the representation (not shown) in the data bank DB of cell $c^2_j$.

3) Increment counter k and initialize a register $A_k$ and a register $X_k$ (Block 4C-3).

4) Construct the sub-complex $X_k$ by adjoining all 1- and 0-cells incident to $c^2_j$, that is, make the sub-complex $X_k$ a closed set (block 4C-4) and store in register $X_k$.

5) Test whether there is another 2-cell $c^2_{j'}$ (see FIG. 4A-1) in the complex X of data bank DB not already included in some prior element $A_i$, and adjacent to a 2-cell in the sub-complex $X_k$ and satisfying any other desired constraint, (such as on the same side of a distinguished 1-cell which may be, for example, a major map feature) as other 2-cells in register $X_k$ (block 4C-5). If there is no other, go to step 9; if there is go to step 6.

6) Test whether adding the 2-cell $c^2_{j'}$ in step 5 and its incident 1-cells and 0-cells to register $X_k$ would cause the sub-complex $X_k$ to exceed a given threshold of complexity (for example, if the corresponding carrier block CB would exceed a given size in bytes of computer memory) (Block 4C-6). If it would so exceed, go to step 9; if not, proceed to step 7.

7) Add $c^2_{j'}$ to $A_k$ and adjoin all incident 1- and 0-cells to $X_k$ so as to keep the sub-complex $X_k$ closed (Block 4C-7).

8) Go to step 5 above (block 4C-8). Note that this would result in selecting yet another 2-cell such as 2-cell $c^2_{j''}$ (shown in FIG. 4A-1 as the cell for step 5 - second pass), possibly resulting in yet another 2-cell and incident 0- and 1-cells being added to the sub-complex $X_k$ to keep it closed. (The loop is continued until the storage threshold of step 6 is exceeded.)

9) $A_k$ and $X_k$ are complete; thus add the contents of $A_k$ to P and store the contents of $X_k$ (Block 4C-9).

10) If there remain any 2-cells not in some $A_i$, go to step 2; if no 2-cells then exit (Block 4C-10).

The partition P is now complete and each sub-complex $X_i$ corresponding to element $A_i$ in P has been constructed and stored as carrier blocks CB corresponding to the given level.

By replacing 2-cells with 3-cells and incorporating 2-cells into the steps for 1-cells, the above accretion method applies to 3-dimensional structures. Similarly, it may be extended to any number of dimensions.

Furthermore, for some applications other information can be attached to the 0-, 1- and 2-cells of the complex X and this information is included in the carrier blocks CB and used to compute the storage size of each carrier block CB. Examples of such information, as described in relation to FIG. 3B, may be street names, addresses, etc. appropriate for the display of a map.

The computer programs in source code listings entitled BUILDLEAF, AMOEBA, and SMTOCARR attached to this specification and described more fully below, implement the above general and more specific algorithms. Particularly, SMTOCARR corresponds to steps 4 and 7, AMOEBA corresponds to steps 5 and 6, and BUILDLEAF corresponds to steps 1–3, and 8–10 of the accretion method.

C. Building the Carrier Block Hierarchy: General: NEXT LEVEL: HIERARCHY: SUMMARY

1. General

As indicated, the software program described in Section IIIB results in a plurality of carrier blocks CB at a given level, e.g., the level 3 shown in FIG. 3. In this Section IIIC, two software algorithms called herein NEXT LEVEL and HIERARCHY, respectively, are described. NEXT LEVEL builds the level i-1 carrier blocks CB from level i carrier blocks CB, for example the level 2 from the level 3 as pictorially shown in FIG. 3, while HIERARCHY essentially iterates NEXT LEVEL to build additional more general levels of carrier blocks CB such as shown for example in level 1 of FIG. 3.

2. NEXT LEVEL a. General

Figure 5A:
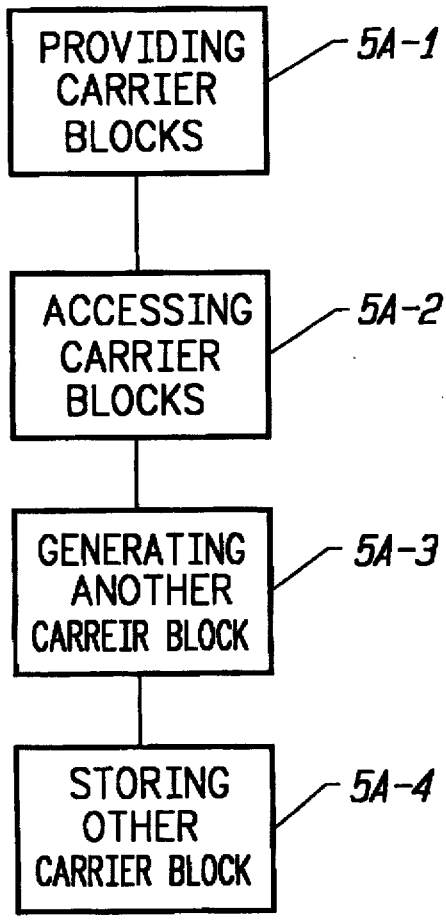
FIGS. 5A and 5B are flow charts of embodiments of a computer program for creating a next level of carrier blocks.

Reference will be made to the flow chart of FIG. 5A to describe generally the algorithm for producing a more generalized "next level" data base from the more detailed, preceding level in the hierarchy. The input data to this method are the plurality of carrier blocks CB representing a given level i or topological complex such as complex X from which the more generalized topological complex X' is produced. Thus, the method includes, using a programmed computer, as follows:

1) Providing the plurality of carrier blocks of data as a digital data base on a data storage medium (block 5A-1).
2) Accessing the plurality of carrier blocks on the digital data base (block 5A-2).
3) Generating from the accessed plurality of carrier blocks at least one other carrier block of data corresponding to the complex X', the other carrier block representing a topological closed set which is topologically equivalent to the data of the plurality of carrier blocks, and wherein the n-cells of the common boundary and the n-cells of the interiors are absorbed in the other carrier block (block 5A-3).
4) Storing the other carrier block on a data storage medium (block 5A-4).

With reference to FIG. 3 and FIG. 3A the above method would apply, for example, to the more detailed carrier block CB corresponding to the element $A_1$ of the complex X which becomes a part of the more generalized carrier block CB corresponding to element $A'_1$ of the complex X'. The 1-cells on the common border of mutually-adjacent 2-cells, and those 2-cells, of element $A_1$ of complex X become absorbed in the element $A'_1$ of complex X'.

b. Specific

Figure 5B:
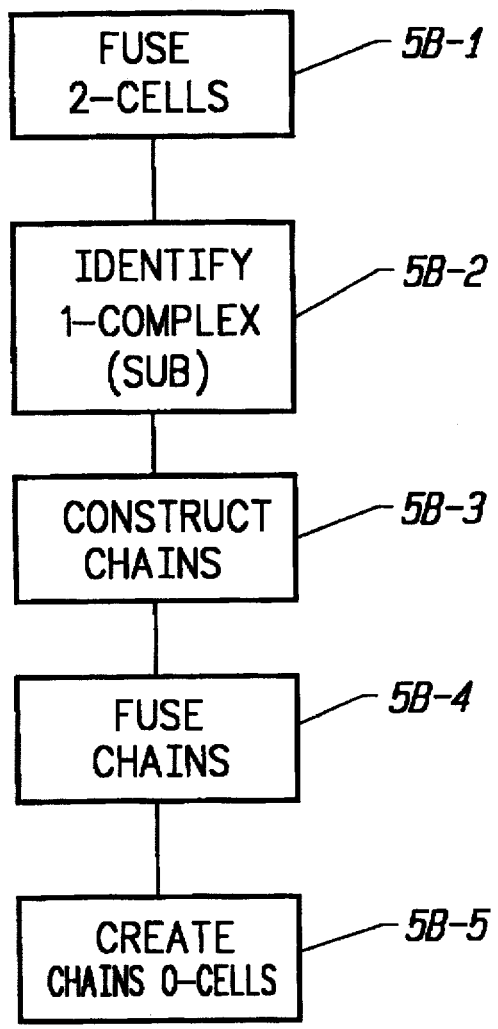
Figure 5C:
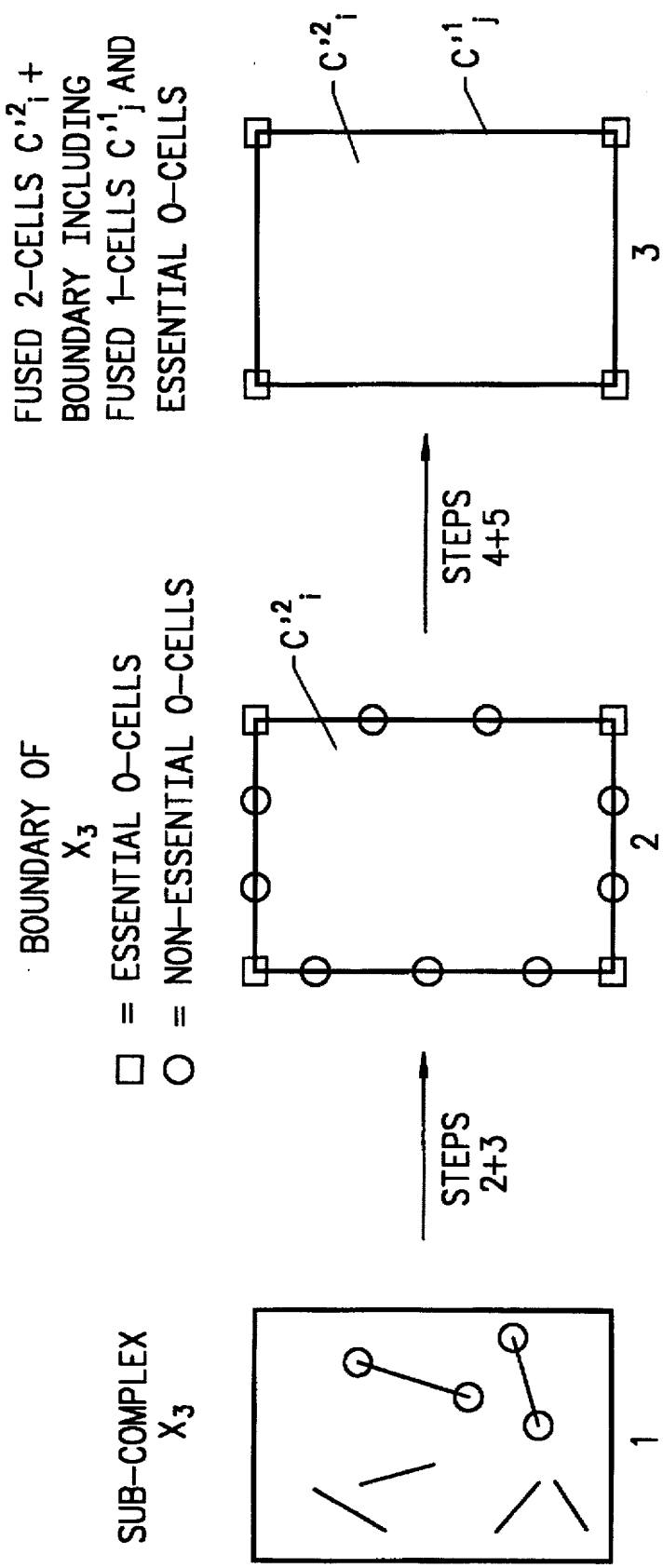
FIG. 5C is an illustration of a topological sub-complex $X_i$ used to explain the flow charts of FIGS. 5A and 5B.

Reference will be made to FIG. 5B and FIG. 5C to describe one embodiment of a more specific algorithm carried out by NEXT LEVEL.

The set of sub-complexes $X_i$ corresponding to the elements $A_i$ of the partition P at level 3 and produced and stored by the method described above in Section II is the input data to the specific algorithm NEXT LEVEL, as already indicated, to produce the next level of carrier blocks CB. NEXT LEVEL produces a complex X' that is topologically equivalent to X but has fewer n-cells. The 0-cells in X' correspond to some of the 0-cells in X, 1-cells to chains of 1-cells, and 2-cells to chains of 2-cells. In making reference to FIGS. 5B and 5C to explain NEXT LEVEL, the latter illustrates pictorially a subcomplex $X_3$ corresponding to element $A_3$ of FIG. 3. Thus, the method is as follows:

1) For each sub-complex $X_i$, fuse (see further description below) all the contained 2-cells to form a single 2-cell $c'^2_i$ (block 5B-1). This is possible because the sub-complex $X_i$ was constructed so that the contained 2-cells $c^2_i$ were mutually adjacent.
2) Identify the 1-dimensional sub-complex comprising the 1-cells on the boundaries of 2-cell $c^2_i$ and the 0-cells bounding those 1-cells (Block 5B-2) (see FIG. 5C-2). This is a sub-complex of the 1-skeleton of complex X. Note that an essential 0-cell is that 0-cell incident to t 1-cells, where t is not equal to 2.
3) Construct connected chains of 1-cells $K^1_j$ so that each chain is bounded by essential 0-cells (block 5B-3). These are the 1-chains common to adjacent sub-complexes or on the boundary of the entire complex X.
4) Fuse each chain $K^1_j$ to form a 1-cell $c'^1_j$ (block 5B-4) (see FIG. 5C-3). This is possible because each chain is connected. If it is desired to also reduce the "metrical" complexity (not just the topological complexity), the 1-cell $c'^1_j$ may be generalized using a straightening algorithm such as the known Douglas-Peuker algorithm.
5) For each essential 0-cell $c^0_k$, create a chain $K^0_k$ comprising the single 0-cells and map this chain into 0-cell $c'^0_m$, which is just a copy of $K^0_k$ (block 5B-5).

The result of executing NEXT LEVEL is that the complex X' comprising the $c'^0_m$, $c'^1_j$, and $c'^2_i$ cells, together with the mapping associating the cells $c'^n$ with chains $K^n$, is the next level in the hierarchy. This method extends also to higher dimensions.

3. HIERARCHY

Figure 6A:
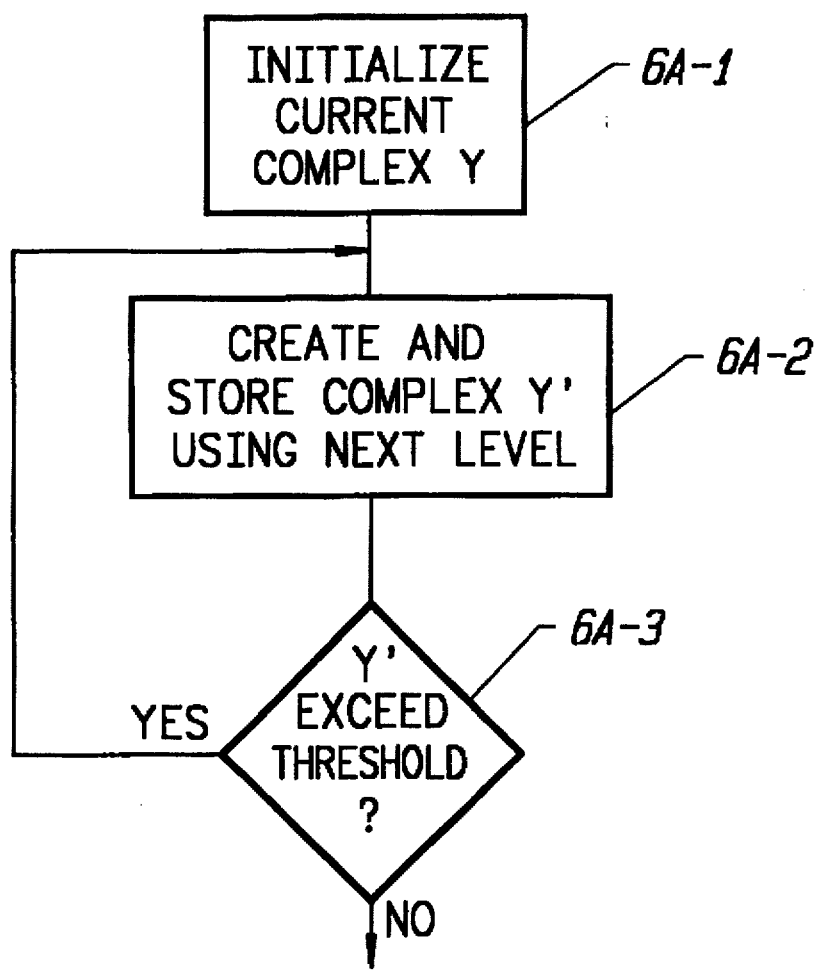
FIG. 6A is a flow chart of one embodiment of a computer program for creating a hierarchy of greater than two levels of carrier blocks.

The following algorithm, called HIERARCHY, merely iterates NEXT LEVEL until the reduced complex X' does not exceed a given complexity threshold. An example of such a threshold is a maximum number of bytes of computer memory required to store a carrier block CB representing the entire complex X'. With reference to FIG. 6A, the steps of the algorithm are as follows:

1. Initialize the current complex (now called Y) to be the given complex X (Block 6A-1).
2. Create and store the complex Y' using the NEXT LEVEL algorithm above (Block 6A-2).
3. If complex Y' exceeds the given complexity threshold, set Y to be Y' and go to step 2.

The result of executing HIERARCHY is that the most general level of carrier blocks CB in the HIERARCHY is built and stored, which in the example of FIG. 3 is level 1. This most general level also is termed the "root", which is used in the search algorithms described below. This method also applies to any number of dimensions.

Moreover, each level in the hierarchy is itself a useful geometric structure, as well as an index to the next level.

The step of fusing a chain of n-cells is accomplished in memory by, for example, simply creating a new cell and copying information from the chain to the new cell. For example, to fuse a chain of 1-cells, one allocates memory for a new 1-cell, records the bounding 0-cells of the new 1-cell to be the two bounding 0-cells for the chain, records the cobounding 2-cells to be the 2-cells on the left and right of the chain of 1-cells, and records the shape of the new 1-cell to be the successive shapes of the chain of 1-cells. In addition, it is often useful to store pointers from the new 1-cell to the 1-cells in the chain, as a means to retrieve detailed data or other associated data such as street names.

The computer programs in source code listings entitled BUILDANC, ANCESTORS, and PARAMOEB implement the above algorithms, as further described below.

4. Summary

In summary, and referring again to FIG. 3 as an example, the above procedures produced the sub-complexes $X_i$ of level 3 and the 0-, 1-, and 2-cells of level 2, but not the partition of level 2. The same procedure is used on the level 2 complex X' to produce the 0-, 1-, and 2-cells of level 1. In FIG. 3, the process ends here. In general, the process is iterated producing a new more generalized level until a single sub-complex that is equal to the whole complex is created. This will occur in the example programs when the data have been reduced enough.

IV. The Search Algorithms

A. Introduction

As previously indicated, a primary purpose in building the carrier blocks CB and their hierarchy is to provide easy and quick access to the relevant geometric information, for example, for display purposes. The search algorithms described below accomplish these purposes.

There are three different search algorithms used with the carrier blocks CB, called, respectively, TOP-DOWN, ACROSS and BOTTOM-UP. All three algorithms find every piece of map at the appropriate scale or level for a given rectangular area for display on a display screen, as disclosed in the above-mentioned co-pending applications of the assignee of the present invention. With no essential changes, these algorithms can be made to search for areas of any shape, not just rectangular.

The TOP-DOWN search starts at the most generalized level, i.e., level 1 in FIG. 3, and proceeds down the index (described more fully below) to succeeding lower levels. An ACROSS search starts with a given coverage at a particular level of generalization, e.g., level 3 in FIG. 3, and retrieves sub-complexes $X_i$ of the digital map data base at the same level. A BOTTOM-UP search is the simplest and proceeds from a detailed level, such as level 3 in FIG. 3, to a more generalized level.

B. TOP-DOWN Search

Figure 7A:
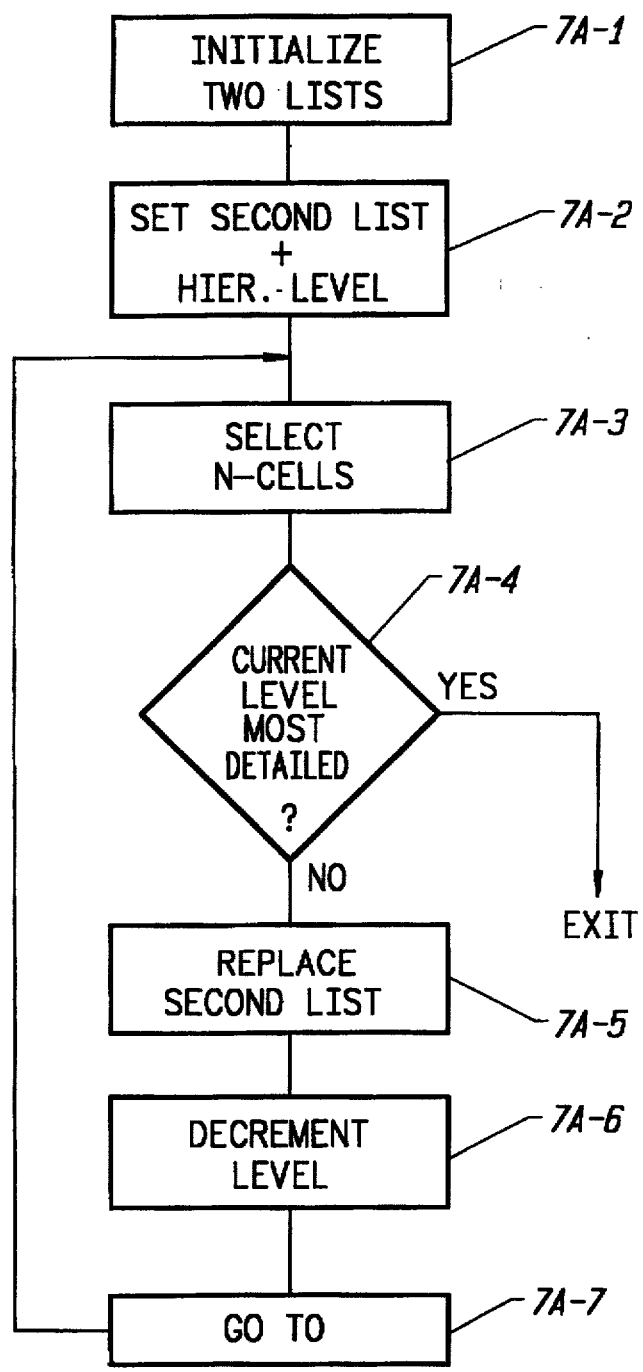
FIG. 7A is a flow chart of one embodiment of a computer program used to perform a "top-down" search of carrier blocks.
Figure 7B:
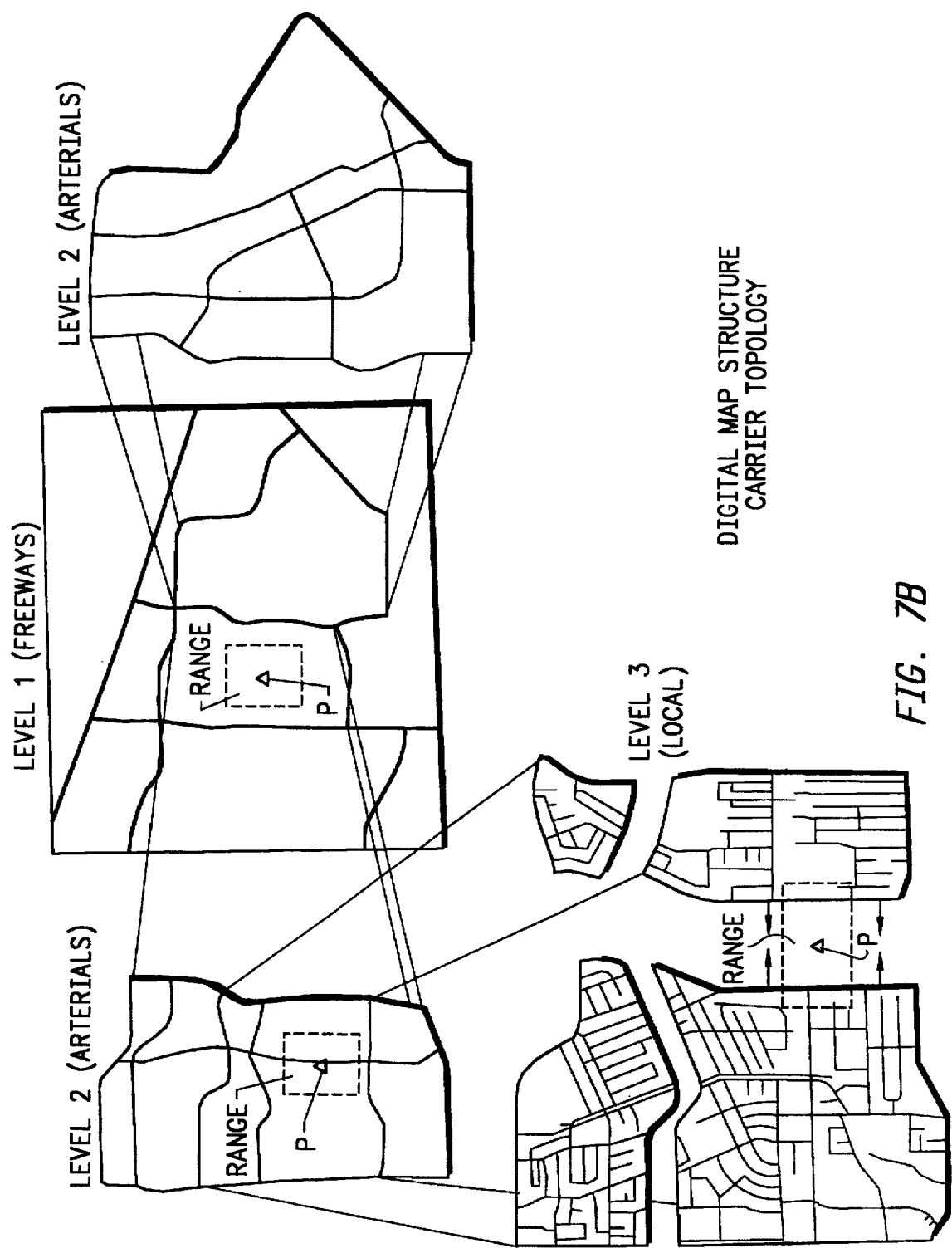
FIG. 7B is an illustration similar to FIG. 3 and used to explain the flow chart of FIG. 7A.

With reference to FIG. 7A and FIG. 7B, to determine which 0-cells, 1-cells, and 2-cells at each level of the hierarchy are within a given rectangle (also called a range) surrounding a point (see FIG. 7B) on a display screen (not shown), the search will begin at the root (by analogy of a tree) and proceed along (by analogy) the branches to the leaves. (The point p described and shown herein corresponds to a symbol DRP, i.e., "dead reckoned position", on the display screen showing the position of the vehicle relative to the position of the displayed map.) The result of the search will be a list of n-cells falling within or intersecting the given range. The algorithm includes the following steps:

1) Initialize two lists (Block 7A-1), a first list of selected cells, which will contain the results, and a second list of current carrier blocks, which is used within the algorithm.
2) Set the second list of current carrier blocks to be the root and set the current hierarchical level to that of the root (level 1 in FIG. 7B) (Block 7A-2).
3) Select from the second list of current carrier blocks the n-cells that fall within a specified range of the point p (see FIG. 7B) (Block 7A-3). Note that this step may employ well-known point-in-polygon and geometric intersection routines. Note further that any geometric range, not just rectangular, could be used by employing different but also well-known geometric routines, and that any dimension may be used.
4) If the current hierarchical level is the most detailed level (level 3 in FIG. 7B), then exit (Block 7A-4). (The output data of the algorithm is the first list of selected cells.)
5) Replace the second list of current carrier blocks with another list containing one carrier block for each 2-cell at the current level in the first list of selected cells, the one carrier block being the carrier block explicitly associated with this 2-cell (Block 7A-5). (These carrier blocks will all be at the next level (level 2 in FIG. 7B) of the hierarchy.)
6) Decrement the current level (Block 7A-6).
7) Go to step 3 (Block 7A-7). (Note, in the example of FIG. 7B the program now goes from level 2 to level 3.)

C. ACROSS Search

Figure 8A:
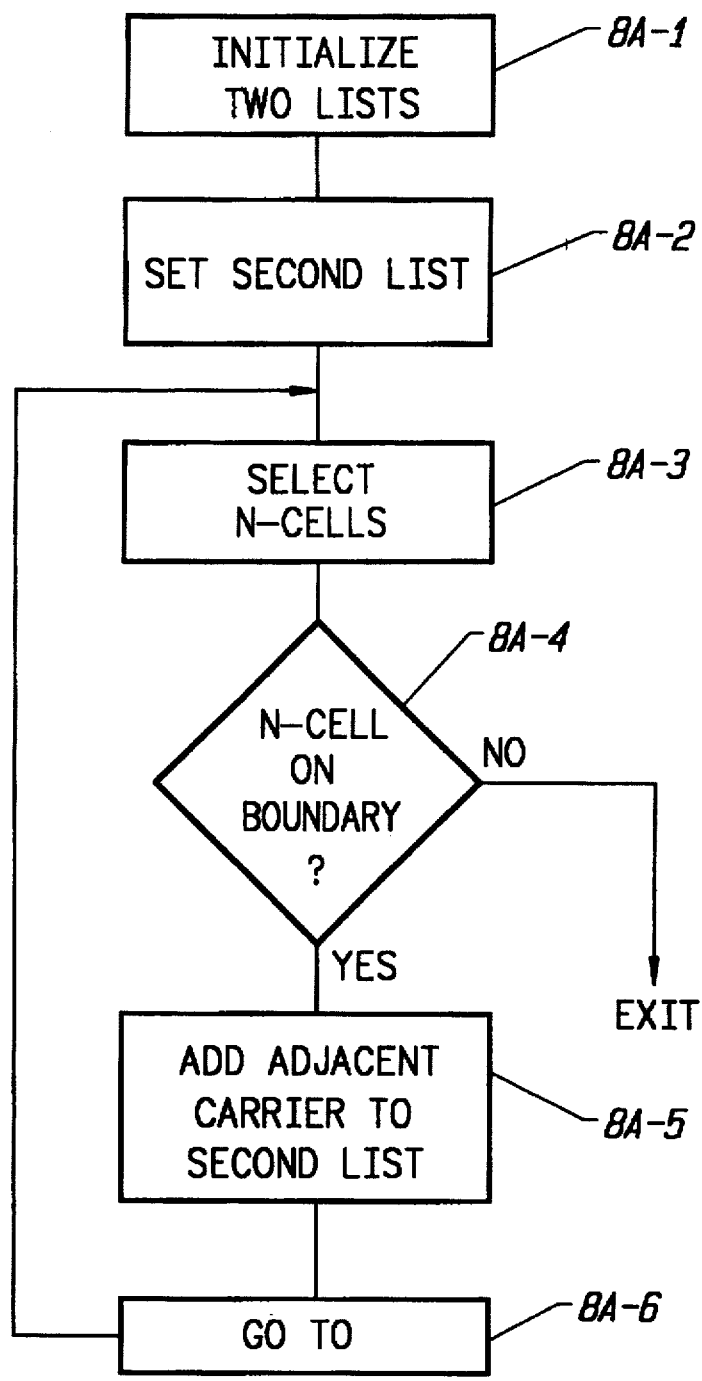
FIG. 8A is a flow chart of one embodiment of a computer program used to perform an "across" search of carrier blocks.
Figure 8B:
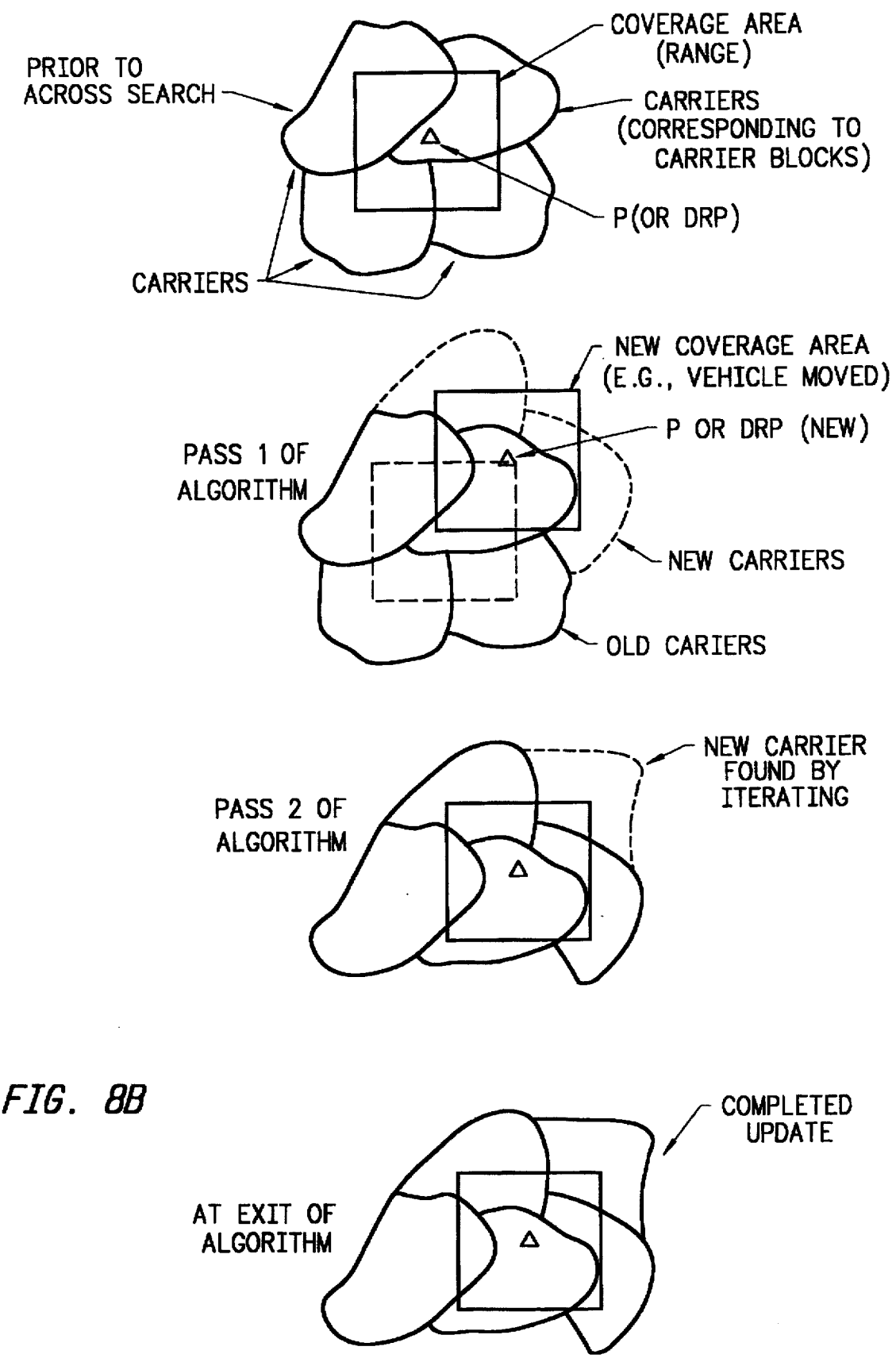
FIG. 8B is a pictorial illustration of a moving map display used to explain the computer program of FIG. 8A.

Reference will be made to the flow chart of FIG. 8A and the pictorial views of FIG. 8B. The latter show the range or rectangular area surrounding the position p of, for example, a vehicle, which, as previously described may be a dead reckoned position DRP. Also shown are a plurality of carriers of a given hierarchical level and having portions within the range. In other words, if it is assumed the rectangular area represents a display screen in a vehicle, then the driver would see on the display the geographical areas corresponding to the portions of the carriers within the range, i.e., carrier blocks CB will have been accessed and retrieved by the on-board computer so as to display this information. Also, as shown in FIG. 8B-2, the change in position of the rectangular area represents the movement of the vehicle to a new position p, thereby resulting in a different map display.

Accordingly, this search is used to determine which n-cells of carrier blocks CB at a given hierarchical level are within a given range of the point p. In describing the method below, assume that prior to step 1 below, the condition illustrated in FIG. 8B-1 occurs, which shows certain carriers and, hence, corresponding carrier blocks CB, one of which is a given carrier block CB. Then, and with reference also to the flow chart of FIG. 8A and FIG. 8B-2, the method includes:

1) Initialize two lists (block 8A-1), a first list of selected cells, which will contain the results, and a second list of current carrier blocks CB, which is used within the algorithm.
2) Set the second list of current carrier blocks CB to be the given carrier block CB.
3) Select from the second list of current carrier blocks CB the n-cells that fall within a specified range of the point p (block 8A-3). Note that this step may employ well-known point-in-polygon and geometric intersection routines. Note further that any geometric range, not just rectangular, could be used by employing different but also well-known geometric routines, and that any dimension may be used.
4) If none of the n-cells selected in step 3 is on the boundary of a carrier, then exit (block 8A-4). This exit or output is represented in FIG. 8B-4.
5) For each n-cell in the first list of selected cells, if the selected n-cell of step 3 is on the boundary of a carrier and the adjacent carrier is not in the second list of current carrier blocks, add that adjacent carrier to the second list (block 8A-5). This is shown pictorially in FIG. 8B-2 which shows new or adjacent carriers being added.
6) Go to step 3 (block 8A-6). This is shown pictorially in FIG. 8B-3 as pass 2 in which yet another carrier may be found by iterating.

D. BOTTOM-UP Search

Figure 9A:
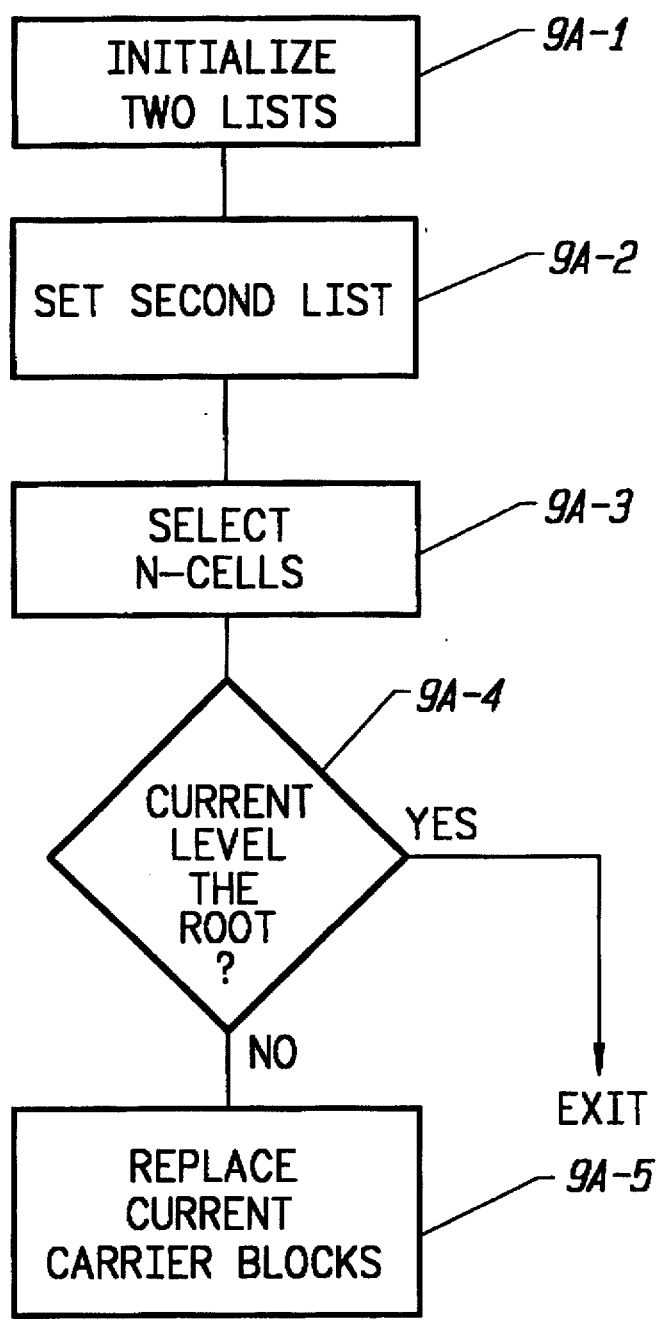
FIG. 9A is a flow chart of one embodiment of a computer program for performing a "bottom-up" search of carrier blocks.

This search is used to determine which n-cells at each hierarchical level from a given level and carrier block CB to the root (e.g., level 1 in FIG. 3), fall within a given range of the point p. Accordingly, and with reference to the flow chart of FIG. 9A, the method includes:

1) Initialize two lists (block 9A-1), a first list of selected cells, which will contain the results, and a second list of current carrier blocks CB, which is used within the algorithm.

2) Set the second list of current carrier blocks to be the given carrier block CB (block 9A-2).

3) Select from the second list of current carrier blocks the n-cells that fall within a specified range of the point p (block 9A-3). Note that this step may employ well-known point-in-polygon and geometric intersection routines. Note further that any geometric range, not just rectangular, could be used by employing different but also well-known geometric routines, and that any dimension may be used.

4) If the current level is the root, then exit (block 9A-4). The output or exit of the method is the first list of selected n-cells.

5) Replace the current carrier blocks CB in the second list with the single carrier block CB at the next level.

V. One Example of the Practical Application of the Carrier Blocks and Search Algorithms As previously indicated, the two co-pending applications of the assignee of the present invention disclose a computerized vehicle navigation system and map display that enable a driver to navigate over a given geographical area and display a moving map on the display screen at different hierarchical or "zoom" levels. The technique of the present invention can be applied to create a digital map data base using carrier topology, as described herein, and search the digital map data base to display the moving map. While the present application is believed to be complete in itself, the above-identified two co-pending applications are hereby incorporated by reference in their entirety.

More specifically, in accordance with the present invention, the digital data base of carrier blocks CB and their hierarchy can be built and stored using the relatively large computer such as the above-mentioned VAX. Then, this digital data base of carrier blocks CB can be copied using conventional techniques onto a portable data storage medium such as a compact cassette, compact disc or tape. The portable data storage medium can then be inserted in the vehicle's on-board computer, which also is programmed with the above-mentioned three search algorithms of the present invention. The search algorithms also can be stored on the portable data storage medium and down-loaded into the on-board computer memory when needed. Thereafter, the digital map data base can be searched and accessed for the display purposes, as will now be further described.

As an example, the TOP-DOWN algorithm can be used to search the digital data base when the driver has inserted, for example, a new cassette storing a new digital map data base than previously used and the vehicle is then first turned on. At this time, the on-board computer stores the current location of the vehicle, which, as described in the co-pending patent applications, is called in those applications a dead reckoned position DRP and has been referenced here as position p. This position p is then used as described in the TOP-DOWN search to search for and access one carrier block CB corresponding to the respective hierarchical levels, e.g., levels 1–3 shown in FIG. 3. As an example, at each such level 1–3, the corresponding block CB is down loaded into the on-board computer and then is available for display, as desired by the driver. That is, as described in the co-pending patent applications, the vehicle driver (or passenger) can select a given "zoom" or "scale" level to display the digital map data base at the selected level. Accordingly, by such a selection, the map portion stored in the carrier block CB corresponding to the selected level 1–3 in the present example will be displayed on the display.

Thereafter, when the vehicle is moving, the ACROSS search is used to access carrier blocks CB at the selected level 1–3 and collect the 0-, 1- and 2-cells which are in the above-mentioned range of the position p. These collected n-cells are then displayed as a moving map display as the vehicle moves over streets and across neighborhoods.

The BOTTOM-UP search is used when the vehicle is first started with the same cassette inserted in the on-board computer, as opposed to a new cassette being inserted as described above for the TOP-DOWN search. At this time, the computer also stores information about the position p of the vehicle. In a similar manner as described for the TOP-DOWN search, carrier blocks CB corresponding to the hierarchical levels 1–3 within the above-described range are searched, accessed and down loaded into the computer, thereby being available for display. The BOTTOM-UP search is thus used to retrieve more generalized map displays with respect to the current known position, starting at level 3 in the present example.

VI. Summary of Advantages of the Present Invention

All topological information of the geometric structure is stored and readily available. This means geometric neighborhoods of any type, such as adjoining neighborhoods Of streets for a map, can be easily retrieved and the consistency of the representation can be enforced. In the case of maps, for example, carrier blocks CB corresponding to the street network can be retrieved, e.g., from the above-mentioned VAX computer, and analyzed as a linear graph (for example for minimum path finding), errors in the map source data can be discovered and eliminated, and completeness of coverage can be verified. Moreover, as stored on the cassettes inserted in the on-board computer of the above-mentioned vehicle navigation system and map display, entire carrier blocks CB of data can be conveniently accessed as the vehicle moves to display a moving map.

Each sub-complex $X_i$ corresponding to an element $A_i$ of the partition P is a topological closed set whose interior is isolated from all others. This enables the updating of each carrier block CB to be accomplished without interference or contradiction to other carrier blocks CB storing adjacent sub-complexes $X_i$. That is, when stored in the VAX computer, these carrier blocks CB can be individually retrieved and displayed for updating purposes without impacting on the information stored in other carrier blocks CB.

The areal coverage of each sub-complex $X_i$ of a partition P at a given level may vary, but the amount of detail and, hence, byte size of a carrier block CB, remains substantially constant, which is efficient for storage and retrieval. In a map, for example, a given carrier block CB might cover a few city streets in San Francisco, while another carrier block CB at the same level might cover the whole state of Wyoming, but both would have substantially the same amount of detail.

Figure 10:
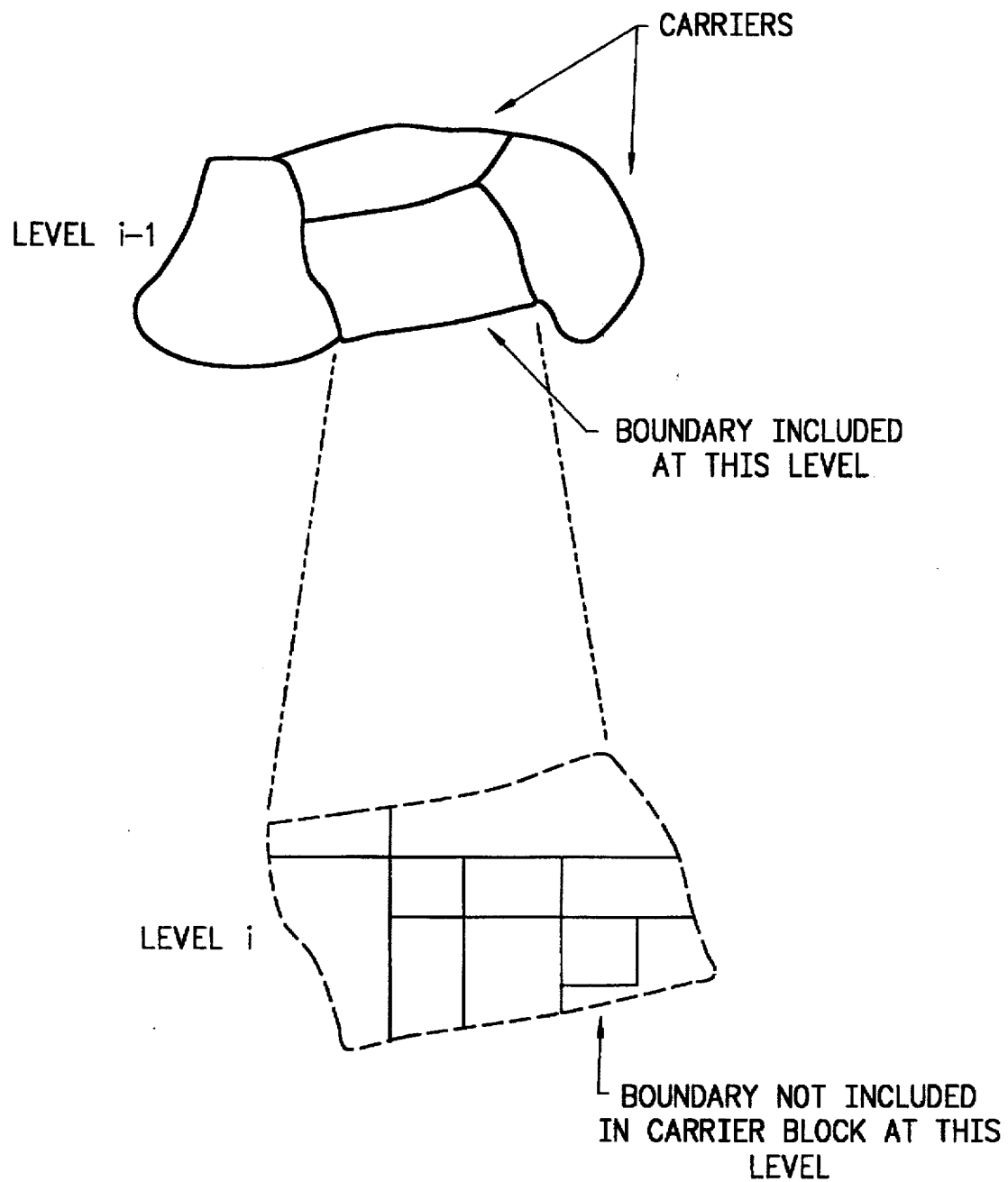
FIG. 10 shows pictorially carriers in order to explain another data encoding feature of the present invention.

Efficient utilization of memory space can be further enhanced by employing the encoding techniques which will now be described in relation to FIG. 10. This FIG. 10 shows a given carrier corresponding to two levels such as level 3 and level 2. The n-cells on the boundary of the carriers are stored in a carrier block CB for one or the other levels, but not both. For example, for level 3, the corresponding carrier block CB does not store the n-cells on the boundary of the carrier, but only the interior n-cells. For level 2, the boundary n-cells of the carrier are stored in the corresponding carrier block CB. Thus, the boundary n-cells are stored only once, thereby saving memory space. When the data in the carrier block CB of level 3 is retrieved, the boundary n-cells can be retrieved from the carrier block CB of level 2.

Also, similar encoding can be accomplished for carrier blocks CB at a given level representing adjacent features. That is, the boundary n-cells may be stored in one or the other such carrier blocks CB but not both.

The hierarchy of successively more generalized complexes X, X', X" ... stored as carrier blocks CB is itself a search index permitting a very efficient search, where the search key is geometrical such as XY coordinate ranges. Also, the index itself is a smaller scale abstraction of the more detailed structure. For example, the index for the element $A'_1$ of level 2 shown in FIG. 3 is the element $A''_1$ of level 1. At the same time, the complex X" is a useful map of, for example, freeways displayed, e.g., in a "zoomed-out" display, and complex X' is a useful map of major access roads displayed in a "zoomed-in" display. Thus, no additional memory storage space is required for a separate map index as in other systems.

While the present invention has been described using carriers with respect to representations of a topological structure and with respect to a geometric structure, such as the above-mentioned DIME data base, it also may be used, for example, with respect to point sets.

VII. Computer Program Listings

Source code listings in "C" language for instructing a computer to perform the above-described algorithms are included as part of this specification in the form of copies of computer printout sheets. These source code listings may be used in connection with the VAX computer previously described or in connection with the above-mentioned vehicle on-board computer which may use an INTEL 8088 microprocessor chip manufactured by Intel Corporation, Santa Clara, Calif., as is appropriate. The titles and general content of these listings are as follows:

1. CARRIER.H;2—This provides definitions of data structures and layouts for the programs.
2. STRUCT.H;2—This is a DIME representation of a complex.
3. BUILDLEAF.C;1—This calls AMOEBA.C;1.
4. AMOEBA.C;1—This builds the sub-complexes $X_i$ from the DIME file.
5. SMTOCARR.C;1—This format carrier blocks CB from the sub-complexes $X_i$.
6. BUILDANC.C;1—This starts the process for building complexes X' ...
7. ANCESTOR.C;1 (and Parent amoeba program)—This has the loop for building next level carrier blocks CB and interacting until build one carrier block CB.
8. FND_PRTS.C—This implements the Bottom-Up search.
9. FND_KIDS.C—This implements the Top-Down search.
10. FND_SIBS.C—This implements the Across search.

All right, title and interest in copyright to the computer programs disclosed in this specification is owned by the assignee of the present invention. Accordingly, the following copyright notice is deemed to apply to each and every one of these programs.

Copyright 1985 Etak, Inc.

The foregoing description of preferred embodiments of the invention has been presented for purposes of illustration and description. It is not inended to be exhaustive or to limit the invention to the precise form described, and many modifications and variations are possible in light of the above teaching. The embodiments were chosen and described in order to best explain the principles of the invention and its practical application to thereby enable others skilled in the art to best utilize the invention in various embodiments and with various modification as are suited to the particular use contemplated. It is intended that the scope of the invention be defined by the claims appended hereto.

```
/***********************************************************/
/*                                                         */
/* The carrier block contains a DIME encoding of a         */
/* closed 2-cell.  It also contains pointers to the        */
/* parent carrier for boundary 1-cell chains.  A single    */
/* 1-cell in the parent corresponds to a chain in this     */
/* carrier.  Each 2-cell at this level points to a         */
/* carrier at the next level containing the interior       */
/* information.                                            */
/*                                                         */
/* Also coded are names and landmarks.  Landmarks have     */
/* a name and coordinate location for annotation and       */
/* are associated with one of the cells in the carrier.    */
/*                                                         */
/* All the cy_hd... fields are offsets, i.e. relative      */
/* byte counts from the beginning of the carrier.          */
/* All the ..._next fields are also offsets from the       */
/* beginning of the carrier and so is the DIME code.       */
/*                                                         */
/* The ..._id fields are offsets from the beginning of     */
/* the carrier.  This permits pointers directly to         */
/* records in the carrier.  Negative ..._id indicates      */
/* a deleted record.                                       */
/*                                          M. White       */
/*                                                         */
/***********************************************************/
#define CARRSIZE 16384
#define CARRHEAD 52
#define RESOL_MASK 0x3F  /* bit resolution mask for cy_general */
#define TWIG_BIT   0x80  /* bit on for twigs in cy_general     */
#define LEAF_BIT   0x40  /* bit on for leaves in cy_general    */
struct carrier {
        unsigned short  cy_id,         /* This record number    */
                        cy_parent,     /* Parent record no      */
                                       /* counts:               */
                        cy_n0,
                        cy_n1,
                        cy_n2,
                        cy_nchn,
                        cy_ntxt,
                        cy_nlmk,
                                       /* Offset pointers:      */
                        cy_hdfree,     /* First free byte       */
                        cy_hd0,        /* 0-cells               */
                        cy_hdchn,      /* Chains of 1-cells     */
                        cy_hd2,        /* 2-cells               */
                        cy_hdtxt,      /* First byte of text    */
                        cy_hdnam,      /* name & addresses      */
                        cy_hdlmk,      /* landmarks             */
                        cy_geog,       /* geocodes constant in  */
                                       /* carrier (text ptr)    */
                        cy_general;    /* level of generalizatn */
        long            cy_wndw[4];    /* Min-Max window in xy  */
        unsigned char   cy_magvr,      /* magnetic variation    */
                        cy_dipvr;      /* dip variation         */
        char            cy_cb[CARRSIZE-CARRHEAD];  /* data buffer */
};
struct zer_dat {
```

```
            short           zr_id,          /* Offset this rec    */
                            zr_next;        /* Offset of next 0-cell*/
            short           zr_z;
            long            zr_extid;       /* External name (Census)*/
            long            zr_x, zr_y;
};
struct one_dat {
            short           on_id,          /* for reference from  */
                                            /* children carriers   */
                            on_next,        /* Next 1-cell in chain */
                                            /* DIME code:          */
                            on_fr, on_to, on_lf, on_rt,
                            on_hdshp,       /* Head of shape chain  */
                            on_chn,         /* Head of chain lead-  */
                                            /* ing to this 1-cell   */
                            on_addr;        /* addresses            */
            long            on_extid;       /* external id (serial) */
};
struct chn_dat {
            short           ch_id,          /* offset to this rec   */
                            ch_next,        /* next chain in carr   */
                            ch_hd0,         /* head of chain 0-cell */
                            ch_tl0,         /* tail of chain 0-cell */
                            ch_hd1,         /* 1st 1-cell in chain  */
                            ch_tl1,         /* last 1-cell in chain */
                            ch_nnam,        /* number of names      */
                            ch_txt[3],      /* names                */
                            ch_parid,       /* id of 1-cell in parnt*/
                                            /* (( 0 for file)       */
                            ch_other;       /* carrier on other side*/
                                            /* if bdy chn           */
            long            ch_extid;       /* External id          */
            unsigned char   ch_class,       /* class of feature     */
                            ch_flags;       /* one-way, windy....   */
};
struct two_dat {
            short           tw_id,          /* offset to this rec   */
                            tw_next,        /* next 2-cell in carr  */
                            tw_carry;       /* Carrier with interior*/
                                            /* of this 2-cell. If   */
                                            /* ( 0, whole file.     */
            long            tw_extid;       /* External id          */
};
struct shp_dat {
            short           sp_next;        /* next shape for this  */
                                            /* 1-cell               */
            short           sp_z;
            long            sp_x, sp_y;
};
struct adr_dat {
            short           ad_1cell;       /* corresp 1-cell       */
            long            ad_tl, ad_tr,
                            ad_fl, ad_fr;
};
struct lmk_dat {
            short           lm_id,          /* offset to this rec   */
                            lm_next,        /* next landmark        */
                            lm_dim,         /* dimension of cell    */
```

```
_DUAB:[MARV.PATENT]CA. IER.H1Z     Sheet 3 of 3        Page 50 lm_cell,       /* pointer to cell        */
                         lm_txt;        /* annotation             */
         long            lm_x,lm_y;     /* place for annotat      */
    };
    struct txt_dat {
         short           tx_id,         /* id of this string      */
                         tx_next,       /* next text string       */
                         tx_lth;        /* length of text         */
         char            tx_text[2];    /* string of any lth      */
    };
    struct fre_dat {
         short           fr_next,       /* next free block        */
                         fr_lth;        /* size of this block     */
    };
    #define CARRSCLXY    (4294967296.0/360.0)  /* Scale factor to cvt */
                                        /* float xy (degrees) to  */
                                        /* long *(2**32)          */
                                        /* aprx = .37 inch/unit   */
    #define CARRSCLZ     1              /* Scl fctr for z pre-    */
                                        /* sumes unit=1ft         */
    #define MAXLEAF      10000          /* max leaf carriers      */
    #define MAXCARR      15000          /* max total carriers     */
    #define MAXMEM       50             /* max carriers in mem    */
    #define WNDWMAX      1048575        /* maximum window size    */
                                        /* to guarantee span (    */
                                        /* 2**12 in cassettes     */ define CARRDATA (CARRSIZE - CARRHEAD)

define ZER_SIZE (sizeof (struct zer_dat))
    #define ONE_SIZE (sizeof (struct one_dat))
    #define TWO_SIZE (sizeof (struct two_dat))
    #define CHN_SIZE (sizeof (struct chn_dat))

#define ONE_MAXM ((ZER_SIZE > TWO_SIZE) ? ZER_SIZE : TWO_SIZE)
    #define ONE_MINM ((ZER_SIZE < TWO_SIZE) ? ZER_SIZE : TWO_SIZE)

#define MAX_ZERS ((CARRDATA - CHN_SIZE - TWO_SIZE) / (ZER_SIZE + ONE_SIZE))
    #define MAX_TWOS ((CARRDATA - CHN_SIZE - ZER_SIZE) / (TWO_SIZE + ONE_SIZE))
    #define MAX_ONES ((CARRDATA - CHN_SIZE - ONE_MAXM) / (ONE_SIZE + ONE_MINM))
    #define MAX_CHNS ((CARRDATA - ONE_MAXM) / (CHN_SIZE + ONE_SIZE + ONE_MINM))
```

```
/* struct.h --------------------------------------------------- */
/*                                                              */
/* This is the general complex model without benefit of         */
/* carriers. It is based on combinatorial topology.             */
/*                                                              */
/* All files are organized similarly. Record 0 in               */
/* every file contains general info, such as map name           */
/* head of list of free records and file size.                  */
/*                                                              */
/* Free list is a list of records that have been ret-           */
/* urned, due to deletions or changes.                          */
/*                                                              */
/* The files are all named conventionally (map)xx.              */
/* (map) is the map name carried in the descrip-page            */
/* of every file and xx describes the file.  xx = 0             */
/* for c0file, 1 for c1file and 2 for c2file.                   */
/*                                                              */
/* This whole system is modelled on the Census 2d               */
/* being almost exactly a translation from PASCAL               */
/* into C.                                                      */
/*                                                              */
/* ------------------------------------------------------------ */
/*                                                              */
/* Original source code              M. White                   */
/* Redocumentation                   J. Killick                 */
```

```
_DUA6:[MARV.PATENT] AUCT.H;2    Sheet 2 of 13     Page 52
/* ---------------------------------------------------------- */
/*                                                            */
/* The first (0th) record in every file contains              */
/* identification information, counts, and pointers           */
/* to the chain of free records.                              */
/*                                                            */
/* ---------------------------------------------------------- */ struct descrip {
        long    descid,         /* id = 0 for descrip */
                filesize,
                freehead,
                lastused;
        char    mapname[128];
};

#define DESCSIZE sizeof(struct descrip)

struct freepage {
        long    freeid,         /* id = -id for free pg */
                nextfree;       /* Pointer to next in chain of free recs */
};
```

```
/* ------------------------------------------------------------ */
/*                                                              */
/* The c0 record contains information pertaining to             */
/* a particular 0-cell.  The record number in the file          */
/* is a 0-cell identifier, which is in the DIME code            */
/* the incident 1-cells.                                        */
/*                                                              */
/* ------------------------------------------------------------ */ struct c0rec {
        long    c0id,           /* id = recno */
                name0;          /* External id */
        double  x,              /* Coordinates */
                y,
                z;
        long    c1head0;        /* Head of list of incident 1-cells */
};

#define C0SIZE sizeof(struct c0rec)
```

```
/* ------------------------------------------------------------- */
/*                                                               */
/* The c1 record contains information pertaining to              */
/* a particular 1-cell. The 1-cell identifier is                 */
/* record number and is used in the 0-cell and 2-cell            */
/* pointers                                                      */
/*                                                               */
/* Descriptive information is also carried here but              */
/* would more sensibly be carried in another file.               */
/* Carrying it here saves files                                  */
/* and i/o in this application.                                  */
/*                                                               */
/* ------------------------------------------------------------- */ struct c1rec {
        long    c1id,
                from,
                to,
                left,
                right,
                nextfr,
                nextto,
                nextlf,
                nextrt,                  /* Addresses for 1-cells ... */
                addrfl,
                addrfr,
                addrtl,
                addrtr,
                shapeid,
                name1,
                priornm,
                nextnm;
        short   class,
                nshp;
};

#define C1SIZE sizeof(struct c1rec)
```

```
_DUA6:[MARY.PATENT]STRUCT.H;2    Sheet 5 of 13    Page 55         */
                                                                  */
/* --------------------------------------------------------------- */
/*                                                                 */
/* The c2 record pertains to a particular atomic                   */
/* 2-cell.  The identifier is the 2-cell record number             */
/* as for the 0- and 1-cells.                                      */
/*                                                                 */
/* --------------------------------------------------------------- */ struct c2rec {
        long    c2id,
                c1head2,
                name2;
};

#define C2SIZE sizeof(struct c2rec)
```

```
/* ----------------------------------------------------- */
/*                                                       */
/* Shape is a string of xyz coordinates for a 1-cell     */
/*                                                       */
/* ----------------------------------------------------- */
struct shape1 {
        struct {
                double  xs,
                        ys,
                        zs;
        } point[NSHAPE];
};

#define SHPSIZE sizeof(struct shape1)
```

```
/* ------------------------------------------------ */
/*                                                  */
/* Chains is a file of chain pointers pointing      */
/* to named 1-cells.  The 1-cells are in a doubly   */
/* linked list of cells with the same name.         */
/*                                                  */
/* ------------------------------------------------ */ struct chnrec {
        char    name[28];
        long    chnhead,                /* Head of linked list of cells */
                chntail;                /* Tail ... */
};
#define CHNSIZE sizeof(struct chnrec)
```

```
/* -------------------------------------------------------------- */
/*                                                                */
/* The name index is a search tree that points to                 */
/* the chnrec file.  This implementation uses the                 */
/* VAX/VMS indexed file, which appears to be something            */
/* like a B-tree.                                                 */
/*                                                                */
/* -------------------------------------------------------------- */ struct namndx {
        char    namex[28];      /* The (primary) key */
                                /* Last char is dim */
        long    chainptr;       /* Pointer to the chain */
                                /* of named records */
};

#define NDXSIZE sizeof(struct namndx)
```

```
/* -------------------------------------------------------------- */
/*                                                                */
/* Xyndx is a Peano code index to xy-coordinates                  */
/* The index file is a VAX/VMS indexed file and the               */
/* key is interlaced integer x- and y- coordinates                */
/* (i.e. the Peano code).                                         */
/*                                                                */
/* -------------------------------------------------------------- */ struct xyndx {
        unsigned char   xy[8];
        long            id;
};

#define XYSIZE sizeof(struct xyndx)
```

```
define MAXBK 4576 struct bknline {                          /* Broken line */
        int             nbk;
        double          xbk[MAXBK],
                        ybk[MAXBK];
        short           keepbk[MAXBK];
};
```

_DUA$:[MARY.PATENT]STRUCT.H;2   Sheet 10 of 13    Page 60

```
/* -------------------------------------------------------------- */
/*                                                                */
/* The submodel is a subset of the entire model                   */
/* kept in main memory. It has some header info                   */
/* and a linked list of 0-, 1-, and 2-cells.                      */
/*                                                                */
/* -------------------------------------------------------------- */ struct c0cell {
        struct c0cell   *nextc0,
                        *priorc0;
        struct c0rec    c0;
};

struct c1cell {
        struct c1cell   *nextc1,
                        *priorc1;
        struct c1rec    c1;
        struct shape1   *s1;            /* Pointer to shape array */
        double          c1_fx,
                        c1_fy,
                        c1_tx,
                        c1_ty;
        struct c1p      *c1_lf,         /* Carrier in progress */
                        *c1_rt;
};

struct c2cell {
        struct c2cell   *nextc2,
                        *priorc2;
        struct c2rec    c2;
};

struct submodel {
        int             c0cnt,
                        c1cnt,
                        c2cnt;
        double          xmin,
                        xmax,
                        ymin,
                        ymax;
        struct c0cell   *c0head,
                        *c0tail;
        struct c1cell   *c1head,
                        *c1tail;
        struct c2cell   *c2head,
                        *c2tail;
};
```

_DUA0:[MARV.PATENT]STRUCT.H;2   Sheet 11 of 13   Page 61

```
/* ------------------------------------------------------------------ */
/*                                                                    */
/* Buffer definitions                                                 */
/*                                                                    */
/* ------------------------------------------------------------------ */ struct filebuf {
        struct filebuf  *bufprior,
                        *bufnext;       /* Linked list */
        long            bufrecl         /* Record number */
        int             buffile,        /* File id */
                        bufwrite,       /* 0 - no change */
                                        /* 1 - must write */
                        bufsize;        /* Bytes of data */
        char            bufdata[256];   /* Record */
};

#define BUFSIZE sizeof(struct filebuf)

/* ------------------------------------------------------------------ */
/*                                                                    */
/* Graph definitions                                                  */
/*                                                                    */
/* Nodes may or may not correspond with 0-cells or                    */
/* with 2-cells.  If not both pointers are NULL.                      */
/*                                                                    */
/* ------------------------------------------------------------------ */ struct node {
        long            ndid;           /* Node identifier */
        struct c0cell   *nd0;           /* Pointer to corresponding */
        struct c2cell   *nd2;           /* 0- or 2-cell */
        struct node     *ndprior,       /* Prior node in graph */
                        *ndnext;        /* Next node in graph */
        short           ndval;          /* Valence */
};
```

```
/* ---------------------------------------------------------- */
/*                                                            */
/* Links may or may not correspond with 1-cells. If           */
/* not lnkl is NULL. Primal and Dual produce graphs           */
/* that correspond with the current submodel. Chains          */
/* produces a reduced graph that does not.                    */
/*                                                            */
/* ---------------------------------------------------------- */ struct link {
        long             lnkid;       /* Link identifier */
        struct clcell    *lnkl;       /* Pointer to corresponding */
        struct node      *lnkfra,     /* From node */
                         *lnkto;      /* To node */
        struct linklist  *lnksubchn;  /* Pointer to chain of links */
        struct component *lnkcomp;    /* Component number */
        struct link      *lnkchn;     /* Link in reduced graph */
        struct link      *lnkprior,   /* Prior link in graph */
                         *lnknext;    /* Next link in graph */
        short            lnkcycle;    /* Cycle number (0 if acyclic) */
};

struct linklist {
        struct link      *llptr;      /* Pointer to a link */
        struct linklist  *llprior,
                         *llnext;
        short            llorient;    /* Orientation */
};
```

```
/* ---------------------------------------------------------- */
/*                                                            */
/*                                                            */
/* A graph has nodes and links (directed arcs) in             */
/* connected components.  Until the Kirchoff analysis         */
/* is done, components and cycles are not known.              */
/* For convenience a graph is stored as a single              */
/* component with negative cycle and acyclic counts           */
/* until Kirchoff determines the facts.                       */
/*                                                            */
/* ---------------------------------------------------------- */ struct component {
        struct node       *cmpndhead,
                          *cmpndtail;
        struct link       *cmplkhead,
                          *cmplktail;
        short             cmpid,         /* Component ident */
                          cmpnnd,
                          cmpnlnk,
                          cmpncyc,
                          cmpnacyc;
        struct component  *cmpprior,
                          *cmpnext;
};

struct graph {
        struct component  *gphcmphead,
                          *gphcmptail;
        short             gphncmp;
};
```

```
/****************************************************/
/*                                                  */
/*  Build all leaf carriers from a 2d database      */
/*                                       M. White   */
/*                                                  */
/****************************************************/ include <stdio.h>
include <ctype.h>
#include "[sources.include]defs.h"
#include "[sources.include]struct.h"
#include "[sources.include]global.h"
#include "[sources.include]carrier.h"
#include "[sources.include]carrext.h"
#include "[sources.include]dio.h"
struct submodel *newsub();
main(argc, argv)
int argc;
char *argv[];
{
        unsigned char   *used2cell,
                        *age;           /* age of carriers      */
        struct submodel **seen2cell;    /* to keep track of 2-cells */
        struct carrier *cy, *carry[MAXLEAF], *buildcarr();
        long window[MAXLEAF][4];        /* window covering each carrier */
        struct descrip drec;
        char ans[80], *sel[25], *ptr;
        int contin;
        double xmin, xmax, ymin, ymax;
        long seed, max2;
        int minx, miny, maxx, maxy, count;
        int i, j, k, fd, rtn, cassfid, status;
        FCB cyfcb;
        char fname[80];
        unsigned char *pc, *pc2;
        short carrid,           /* current carrier id */
              maxcarr;
        printf("Carrier construction\n\n");
        carrid = 2;             /* reserve 1 for parent carrier */
        if (argc >= 2)
                strcpy(currmap, argv[1]);       /* map name from cmd */
        else {
                printf("Enter map name ->");
                gets(currmap);
        }
        printf("Current map is %s\n", currmap);
        rdmap(currmap);
        frd(c2file, 0L, &drec, DESCSIZE);
        max2 = drec.lastused;
        printf("%d 2-cells maximum\n", max2);
        pc = used2cell  = malloc(max2); /* keep track of 2-cells used and */
        pc2= seen2cell  = malloc(max2*sizeof(*seen2cell)); /* encountered by amoeba */
        age = malloc(max2);             /* buffer age for carriers */
        for (i=0; i(max2; ++i) {
                *pc++ = 0;              /* No 2-cells used yet */
                *pc2++= NULL;           /* No 2-cells encountered yet */
        }
        do {
```

_DUA$:[MARV.PATENT]BUILDLEA..C;1    Sheet 2 of 7    Page 65

```c
                aski("Avoid 2-cell -)", &i);
                used2cell[i] = 1;
        } while (i > 0);
/*
 * Initialize 2-cell markers
 */
        contin = 1;
        aski("Enter seed 2-cell for amoeba -)", &seed);
/*
 * Retrieve closed nhbd of seed 2-cell
 */
        curadd2(seed);
        bdy2();
        bdy1();
        range(&curr->xmin, &curr->xmax, &curr->ymin, &curr->ymax);
        seen2cell[seed] = curr;
        curr = newsub();
        printf("Creating LEAF.DAT\n");
        status = dcreate(&cyfcb, "leaf.dat", MODE_WRITE, FAB$C_FIX, 512, 50);
        if (status) {
                fprintf(stderr, "** ERROR dcreate status = %04X\n", status);
                exit(status);
        }
        while (contin) {
/*
 * Look for 2-cell already in memory, if that fails look for one
 * adjacent to a 2-cell already used
 */
                for (i=1; (i<max2 &&
                            (used2cell[i] !!
                             (seen2cell[i]==NULL) !! (seen2cell[i]== -1));
                                ++i)
                        ;       /* loop control does job */
                if (i >= max2)
                  for (i=1; (i<max2 && (used2cell[i] !! (seen2cell[i]==NULL));
                                ++i)
                        ;       /* loop control does job */
                if (i>=max2) {
                        contin = 0;
                        seed = 0;
                }
                else {
                        seed = i;
                        /* if max in memory exceeded free one */
                        if (carrid > MAXMEM)
                                free(swapold(carry, carrid, &cyfcb, age));
                        if (cysize(curr) <= 7*sizeof(struct carrier)/10) {
                                amoeba(seed, '3', used2cell, seen2cell);
                                cy = carry[carrid] = buildcarr(curr, carrid);
                                printf("Carrier %3d size = %5d ",
                                        cy->cy_id, sizecarr(cy));
                                countseen(seen2cell, max2);
                                age[carrid] = 0;
                                for (k=0; k<4; k++)
                                        window[carrid][k] = cy->cy_wndw[k];
                                for (i=2; i<carrid; ++i)
                                        if (overlap(window[carrid], window[i])) {
                                                if (carry[i] == NULL)
```

```
                                        rollin(carry, i, carrid,
                                                &cyfcb, age);
                                    linksib(carry[carrid], carry[i]);
                                    age[i] = 1;
                        }
                        writecarr(carry, carrid, &cyfcb);
                        carry[1] = carry[carrid];     /* make 1st point last */
                        ++carrid;
                }
                else {
                        sprintf(stderr,"2-cell %5d too big ****",
                                seed);
                        used2cell[seed] = 1;
                }
                currclr();
                if ((carrid % 100) == 0) {
                        for (i=1; i<carrid; ++i)
                                writecarr(carry, i, &cyfcb);
                }
            }
        }
        for (i=1; i<carrid; ++i)
                writecarr(carry, i, &cyfcb);
        dclose(&cyfcb);
        closemap();
        printf("Done...  %5d carriers\n", carrid);
}
/********************************************************/
/*                                                      */
/* Link sibling carriers                                */
/* This isolates bounding 1-skeleton for carrier blks   */
/*                              M. White                */
/*                                                      */
/********************************************************/
int likechn(cy1, ch1, cy2, ch2)  /* return TRUE (1) for chains */
                                 /* with same class, flags and */
                                 /* names                      */
struct carrier *cy1, *cy2;
struct chn_dat *ch1, *ch2;
{
        struct txt_dat *tx, *tx1, *tx2;
        int i;
        char *str;
        if (ch1->ch_nnam != ch2->ch_nnam) return(0);
        if (ch1->ch_class != ch2->ch_class) return(0);
        if (ch1->ch_flags != ch2->ch_flags) return(0);
        for (i=0; i<ch1->ch_nnam; ++i) {
                tx1 = (struct txt_dat *)((char *)cy1 + ch1->ch_txt[i]);
                tx2 = (struct txt_dat *)((char *)cy2 + ch2->ch_txt[i]);
                if (i == 0) {
                }
                if (strcmp(tx1->tx_text, tx2->tx_text) != 0)
                                return(0);
        }
/*
 * Similar chains - return true
 */
        return(1);      /* passed all tests */
```

```
}
/*                                                                          */
/****************************************************************************/
/*                                                                          */
int orientch(ch)            /* return orientation                           */
struct chn_dat *ch;         /* -1 for non-zero on rt                        */
                            /* +1 for otherwise                             */
{
struct carrier *cy;
struct one_dat *on;
int orient;
        cy = (char *)ch - ch->ch_id;
        on = (char *)cy + abs(ch->ch_hd1);      /* head 1-cell */
        orient = sign(ch->ch_hd1);
        if (on->on_rt != 0)
                orient = -orient;
        return(orient);
}
/*                                                                          */
/****************************************************************************/
/*                                                                          */
/*  Find a chain in cy2 similar to ch1 in cy1                               */
/*                                                                          */
struct chn_dat *findch(cy1, ch1, cy2)
struct carrier *cy1, *cy2;
struct chn_dat *ch1;
{
        struct chn_dat *ch2;
        struct one_dat *head1, *tail1, *head2, *tail2;
        short off, or1, or2;    /* offsets and orientations */
        or1 = orientch(ch1);
        for (off=cy2->cy_hdchn; off!=0; off=ch2->ch_next) {
                ch2 = (struct chn_dat *)((char *)cy2 + off);
                or2 = orientch(ch2);
                if (likechn(cy1, ch1, cy2, ch2)) {
                        /* now check 1-cells on the end of the chain */
                        head1 = (char *)cy1 + abs(ch1->ch_hd1);
                        tail1 = (char *)cy1 + abs(ch1->ch_tl1);
                        head2 = (char *)cy2 + abs(ch2->ch_hd1);
                        tail2 = (char *)cy2 + abs(ch2->ch_tl1);
                        if ((head1->on_extid == head2->on_extid) &&
                            (tail1->on_extid == tail2->on_extid) &&
                            (or1 == -or2))
                                return(ch2);
                        if ((head1->on_extid == tail2->on_extid) &&
                            (tail1->on_extid == head2->on_extid) &&
                            (or1 == or2))
                                return(ch2);
                }
        }
        return(NULL);
}
/*                                                                          */
/****************************************************************************/
/*                                                                          */
linksib(cy1, cy2)
struct carrier *cy1, *cy2;
{
```

```
_DUMP:[MARV.PRTPNT]BUILDLEAF.C;1    Sheet 5 of 7      Page 68
        short   off1, off2;
        struct chn_dat *ch1, *ch2;
        struct one_dat *on1, *on2;
        struct zer_dat *zr1, *zr2;
        struct txt_dat *tx, *tx1, *tx2;
        char  str1[128], str2[128];
        char *str;
/*
 * Scan cy1 for boundary chains
 */
        splitpair(cy1, cy2);    /* split chains at common partition points */
        for (off1=cy1->cy_hdchn; off1!=0; off1=ch1->ch_next) {
            ch1 = (struct chn_dat *)((char *)cy1 + off1);
            on1 = (struct one_dat *)((char *)cy1 +
                                        abs(ch1->ch_hd1));
            if (((on1->on_lf == 0) || (on1->on_rt == 0)) &&
                                        (ch1->ch_other == 0)) {
                ch2 = findch(cy1, ch1, cy2);
                if (ch2 != NULL) {
                    on2 = (char *)cy2 + abs(ch2->ch_hd1);
                    if (((on2->on_lf != 0) && (on2->on_rt != 0)) ||
                            (ch2->ch_other != 0)) {
                        fprintf(stderr,"ERROR - cy %d ch %d other %d rematched\n",
                                    cy2->cy_id, ch2->ch_id, ch2->ch_other);
                        fprintf(stderr,"   to - cy %d ch %d other %d\n",
                                    cy1->cy_id, ch1->ch_id, ch1->ch_other);
                    }
                    /* matchdmp(ch1, ch2); /* debugging */
                    ch2->ch_other = cy1->cy_id;
                    ch1->ch_other = cy2->cy_id;
                }
            }
        }
}
/*                                                        */
/**********************************************************/
/*                                                        */
/* Split boundary chains at common branch points          */
/* in a pair of carriers, i.e. identify essential         */
/* 0-cells.                                               */
/*                                                        */
splitpair(cy1, cy2)
struct carrier *cy1, *cy2;
{
        struct chn_dat *ch1, *ch2;
        struct zer_dat *zr1, *zr2;
        struct one_dat *on, *on1;
        short  off1, off2, isbdy, somesplit;
        do {
            somesplit = 0;  /* count of splits this time thru loop */
            for (off1=cy1->cy_hdchn; off1!=0; off1=ch1->ch_next) {
                ch1 = (char *)cy1 + off1;
                on = (char *)cy1 + abs(ch1->ch_hd1);
                isbdy = ((on->on_lf == 0) || (on->on_rt == 0));
                if (isbdy) {
                    /* is a boundary chain - cf with other carrier */
                    for (off2=cy2->cy_hdchn; off2!=0;
                                        off2=ch2->ch_next) {
```

```c
                        ch2 = (char *)cy2 + off2;
                        on2 = (char *)cy2 + abs(ch2->ch_hdl);
                        isbdy = ((on2->on_lf == 0) ||
                                 (on2->on_rt == 0));
                        if (isbdy && likechn(cy1,ch1, cy2,ch2)) {
                                somesplit += splitchn(cy1,ch1,
                                                       cy2,ch2);
                        }
                    }
                }
            }
        } while (somesplit > 0);
}
/*                                                              */
/****************************************************************/
/*                                                              */
/* Split a pair of chains at every point of                     */
/* departure - identify essential 0-cells                       */
int splitchn(cy1, ch1, cy2, ch2)
struct carrier *cy1, *cy2;
struct chn_dat *ch1, *ch2;
{
        struct one_dat *on;
        short nsplit, startsplit, ch1th, ch2th, off1, i, j;
        struct {
                struct  one_dat *onx;   /* 1-cell pointer */
                short   offx;           /* +- offset     */
                int     subscr;
        } zch[MAX_ONES],                /* array of nodes from chn 1 to match */
          ych[MAX_ONES];                /* array from chain 2                 */
/*
 * List 1-cells of chain 1 in order
 */
        ch1th = 0;
        for (off1=ch1->ch_hdl; off1!=0; off1=on->on_next) {
                on = (char *)cy1 + abs(off1);
                zch[ch1th].onx = on;
                zch[ch1th].offx= off1;
                zch[ch1th].subscr = -1;     /* mark as unmatched */
                ch1th++;
        }
/*
 * List 1-cells of chain 2 in order
 */
        ch2th = 0;
        for (off1=ch2->ch_hdl; off1!=0; off1=on->on_next) {
                on = (char *)cy2 + abs(off1);
                ych[ch2th].onx = on;
                ych[ch2th].offx= off1;
                ych[ch2th].subscr = -1;     /* mark as unmatched */
                ch2th++;
        }
/*
 * Scan both lists to locate corresponding 1-cell (if any) in other
 * chain
 */
        for (i=0; i<ch1th; i++) {
                for (j=0; j<ch2th && (zch[i].subscr== -1); j++)
```

```
                    if (zch[i].onx->on_extid == ych[j].onx->on_extid)
                            zch[i].subscr = j;
        }
        for (i=0; i<ch2lth; i++) {
                for (j=0; (j<ch1lth) && (ych[i].subscr== -1); j++)
                        if (ych[i].onx->on_extid == zch[j].onx->on_extid)
                                ych[i].subscr = j;
        }
/*
 * Now split both chains at each branch point
 * After 1st split some nodes may be in other chains
 * and must be discovered and split in subsequent passes
 */
        nsplit = 0;
        startsplit = nsplit;
        for (i=1; (i<ch1lth) && (nsplit==startsplit); i++) {
                if (((zch[i-1].subscr == -1) && (zch[i].subscr != -1)) ||
                    ((zch[i-1].subscr != -1) && (zch[i].subscr == -1))) {
                        cyspltch(cy1, ch1, zch[i-1].offx, zch[i].offx);
                        nsplit++;
                }
        }
/*
 * Chain 2 splitting chain 1
 */
        startsplit = nsplit;
        for (i=1; (i<ch2lth) && (nsplit==startsplit); i++) {
                if (((ych[i-1].subscr == -1) && (ych[i].subscr != -1)) ||
                    ((ych[i-1].subscr != -1) && (ych[i].subscr == -1))) {
                        cyspltch(cy2, ch2, ych[i-1].offx, ych[i].offx);
                        nsplit++;
                }
        }
/*
 * If either chain is a loop split other at essential node
 *  since it may be chosen arbitrarily
 */
        if ((nsplit==0) &&
            ((ch1->ch_hd0 == ch1->ch_tl0) ||
             (ch2->ch_hd0 == ch2->ch_tl0))) {
                if ((ych[0].subscr != -1) && (ch1lth > 1)) {
                        cyspltch(cy1, ch1, zch[0].offx, zch[1].offx);
                        nsplit++;
                }
                if ((zch[0].subscr != -1) && (ch2lth > 1)) {
                        cyspltch(cy2, ch2, ych[0].offx, ych[1].offx);
                        nsplit++;
                }
        }
/*
 * return split or not
 */
        return(nsplit);
}
```

```c
/****************************************************/
/*                                                  */
/* Construct carrier blocks by absorbing 2-cells    */
/* one at a time until maximum size for block       */
/* or higher priority roads are encountered         */
/*                                                  */
/****************************************************/
include <stdio.h>
#include "[sources.include]carrier.h"
#include "[sources.include]defs.h"
#include "[sources.include]struct.h"
#include "[sources.include]extern.h"
/*                                                  */
/****************************************************/
/*                                                  */
/* return 2-cell id if on boundary 0 if interior    */
long othersd(p1, used2cell)                /*#func_name*/
struct c1cell *p1;
unsigned char *used2cell;
{
        if (!used2cell[p1->c1.left])
                        return(p1->c1.left);
        if (!used2cell[p1->c1.right])
                        return(p1->c1.right);
        return(0);
}
/*                                                  */
/****************************************************/
/*                                                  */
/* bring a 2-cell into memory if not already in     */
struct submodel *grab2cell(id, used2cell, seen2cell)  /*#func_name*/
long id;                /* id of 2cell */
unsigned char *used2cell;       /* flag */
struct submodel *seen2cell[];   /* pointer to single closed 2-cell */
{
struct submodel *smhold;
        if (id <= 0)
                return(NULL);
        if (used2cell[id])
                return(NULL);
        /* check for never seen or never retrieved */
        if ((seen2cell[id] == NULL) || (seen2cell[id] == -1)) {
                smhold = curr;
                curr = seen2cell[id] = newsub();
                curadd2(id);
                bdy2();
                bdy1();
                range(&curr->xmin, &curr->xmax, &curr->ymin, &curr->ymax);
                curr = smhold;
        }
        return(seen2cell[id]);
}
/*                                                  */
/****************************************************/
/*                                                  */
/* Main leaf carrier building program               */
/*                                                  */
int amoeba(seed, intclass, used2cell, seen2cell)      /*#func_name*/
```

```
                                        /* returns count of 2-cells assimilated */
int seed;                               /* seed 2-cell                          */
unsigned char intclass;                 /* major boundary class                 */
char *used2cell;                        /* tally of used and avail 2-cells      */
struct submodel *seen2cell[];           /* pointers to single 2-cell submodels  */
                                        /* seen2cell[i] = NULL for 2-cell never */
                                        /* encountered; = -1 for adjacent to built */
                                        /* carrier; (address) for 2-cell retrieved */
                                        /* but not yet used                     */
{
        struct c0cell *tail0;   /* pointer to remember prior state of submodel */
        struct c1cell *p1,      /* utility pointer         */
                      *sel1,    /* pointer to tentatively selected 1-cell */
                      *tail1,   /* pointer to remember prior state of submdl */
                      dummy1;   /* dummy to avoid NULL pointers */
        struct c2cell *p2,      /* utility ptr */
                      *tail2;   /* pointer to remember prior state of submdl */
        struct submodel *smhold,/* pointers to hold aside current submodel */
                        *smhold2;
        long          cs,
                      side,     /* 2-cell id on other side of 1-cell    */
                      selside;  /* selected 2-cell id                   */
        int           major,minor,  /* major bdy flag */
                      markplc,  /* mark place in amoeba flag */
                      d,        /* pctg overlap of 2-cell wndw with carrier */
                      dsel,     /* overlap of selected 2-cell */
                      candsz,   /* size of carrier block for 2-cell */
                      selsize,  /* next 2-cell candidate data */
                      sizethresh, /* space remaining in carrier block */
                      sizelim,  /* limit on carrier size in bytes */
                      sizeok,   /* flag that size is not too big */
                      notdone,  /* flag */
                      n2,       /* count of 2-cells in carrier */
                      first2cell; /* first 2-cell                */
        unsigned char maxclass; /* max class boundary crossed */
/*
 * Initialize
 */
        maxclass = intclass-1;          /* keep track of highest class bdy */
        dummy1.cl.class = '4' & 0xFF;   /* cross '4' but not '3' class bdys */
        dummy1.cl.left = dummy1.cl.right = -1;
        currclr();                      /* clear current submodel and return memory */
        free(curr);
/*
 * Get current submodel for seed 2-cell
 */
        curr = grab2cell(seed, used2cell, seen2cell);
        seen2cell[seed] = NULL;         /* used it up */
        used2cell[seed] = 1;
        first2cell = seed;
        n2 = 1;
        used2cell[seed] = 1;            /* mark as used */
        range(&curr->xmin, &curr->xmax, &curr->ymin, &curr->ymax);
/*
 * Loop until boundaries encountered or size max
 */
        tail0 = tail1 = tail2 = NULL;
        major = 0;                      /* no major bdy so far */
```

```
                markplc = 1;             /* flag - mark place after each 2-cell */
                                         /* until major bdy encountered */
                sizelim = 95*(sizeof(struct carrier))/100;
                p2 = curr->c2head;       /* to get thru while test 1 time */
                while ((sizeok=(cs=cysize(curr)) < sizelim) && (p2 != NULL)) {
                        range(&curr->xmin, &curr->xmax, &curr->ymin, &curr->ymax);
                        ++n2;
/*
 * Select next 2-cell.  Choose one with max window overlap but not across
 *      priority boundary.
 */
                dsel = 0;
                sell = &dummy1;
                selside = 0;
                sizethresh = sizeof(struct carrier) - cs;
                selsize = sizethresh + 1;
/*
 * Loop thru all 1-cells looking for adjacent 2-cells
 *      to find lowest priority boundary and then
 *      select candidate having most overlap and then smallest size
 *      (this captures interior lakes and islands)
 */
                p2 = NULL;
                for (p1=curr->c1head;             /* while there are 1-cells */
                        (p1!=NULL);
                        p1=p1->nextc1) {
                        if ((side=othersd(p1, used2cell)) > 0) {
                                /* Only select if higher or = class than max */
                                if (minor=highcls(p1->c1.class, sell->c1.class)) {
                                        smhold = curr;        /* save current submodel */
                                        /* get workspace */
                                        curr = grab2cell(side, used2cell,
                                                seen2cell);
                                        if (curr != NULL) {
                                                d = rangovlp(smhold, curr);
                                                candsz = cysize(curr);
                                        }
                                        else {
                                                d = dsel-1;
                                                candsz = selsize+1;
                                        }
                                        if ((d)dsel) ||
                                           (p1->c1.class != sell->c1.class) ||
                                           ((d==dsel) && (candsz<selsize))) {
                                                major = highcls(maxclass,
                                                        p1->c1.class);
                                                sell = p1;
                                                dsel = d;
                                                selsize = candsz;
                                                selside = side;
                                        }
                                        curr = smhold;
                                }
                        }
                }
                if (sell == &dummy1) {   /* if sell hasen't changed */
                        seed = 0;
                        p2 = NULL;
```

```
                              markplc = 1;    /* nothing adjacent - mark place */
                    }
                    else
                              seed = selside;
/*
 * Memorize current submodel if a major boundary about to be crossed
 * or if nothing more adjacent
 */
                    if ((major) || markplc) {
                              /* turn off markplc if major bdy */
                              if (major) {
                                         markplc = 0;
                                         maxclass = sel1->c1.class;
                              }
                              tail0 = curr->c0tail;
                              tail1 = curr->c1tail;
                              tail2 = curr->c2tail;
                    }
                    if (seed > 0) {
/*
 * Assimilate seed 2-cell into full submodel
 */
                              p2 = seen2cell[seed]->c2head;
                              assimil(seen2cell[seed]);
                              used2cell[seed] = 1;    /* mark as used */
                    }
          }
          if ((tail2 != NULL) && (!sizeok || major)) {
                    /* trim submodel back to last major street or if too big */
                    used2cell[seed] = 0;
                    p2 = tail2;
                    if (p2 != NULL)
                              p2 = p2->nextc2;
                    while (p2 != NULL) {
                              used2cell[p2->c2.c2id] = 0;    /* not used yet */
                              --n2;
                              p2 = p2->nextc2;
                    }
                    trimsm(tail0, tail1, tail2);
          }
/*
 * Release memory for single 2-cell submodels assimilated
 */
          n2 = 1;
          printf("2-cells: %7d", first2cell);
          for (p2=curr->c2head; p2!=NULL; p2=p2->nextc2) {
                    if (seen2cell[p2->c2.c2id] != NULL) {
                              ++n2;
                              printf(" %7d", p2->c2.c2id);
                              if ((n2%8) == 0)
                                         printf("\n              ");
                              smhold = curr;
                              curr = seen2cell[p2->c2.c2id];
                              currclr();
                              free(seen2cell[p2->c2.c2id]);
                              seen2cell[p2->c2.c2id] = NULL;
                              curr = smhold;
                    }
          }
```

```
        }
        printf("\n");
/*
 * Find adjacent 2-cells
 */
        for (p1=curr->c1head; p1!=NULL; p1=p1->nextc1) {
                if ((seen2cell[p1->c1.left]==NULL) && !used2cell[p1->c1.left])
                                seen2cell[p1->c1.left] = -1;    /* mark as seen */
                if ((seen2cell[p1->c1.right]==NULL) && !used2cell[p1->c1.right])
                                seen2cell[p1->c1.right] = -1;
        }
        return(n2);             /* count of 2-cells assimilated */
}
/*                                                                          */
/****************************************************************************/
/*                                                                          */
/* Delete last elements added to submodel                                   */
trimsm(tail0, tail1, tail2)                                     /**func_name*/
struct c0cell *tail0;
struct c1cell *tail1;
struct c2cell *tail2;
{
        while ((curr->c0tail != tail0) && (curr->c0tail != NULL))
                        curdel0(curr->c0tail);
        while ((curr->c1tail != tail1) && (curr->c1tail != NULL)) {
                        curdel1(curr->c1tail);
        }
        while ((curr->c2tail != tail2) && (curr->c2tail != NULL))
                        curdel2(curr->c2tail);
}
```

```
_DUA0:[MARV.PATENT] :OCARR.C;1   Sheet 1 of 5        Page 76

/****************************************************/
/*                                                  */
/* Build a carrier from a 2d submodel               */
/*                                    M. White      */
/*                                                  */
/****************************************************/
include <stdio.h>
include <ctype.h>
#include "[sources.include]defs.h"
#include "[sources.include]struct.h"
#include "[sources.include]extern.h"
#include "[sources.include]carrier.h"
#include "[sources.include]carrext.h"
struct submodel *newsub();
/*                                                  */
/****************************************************/
/*                                                  */
/* Build carrier from current submodel              */
struct carrier *buildcarr(sm, id)                      /* func_name */
struct submodel *sm;    /* sub model to be converted */
short id;
{
        struct carrier *c;
        struct c0cell *p0;
        struct c1cell *p1, *q1;
        struct c2cell *p2;
        struct chnrec chn;
        struct zer_dat z, *zp;
        struct one_dat o, *op;
        struct two_dat t, *tp;
        struct adr_dat a, *ap;
        struct shp_dat s, *sp, *prior;
        struct txt_dat *name[10];
        struct link *lk;
        struct bknline bkn;
        short i, j, k, nname;
        struct link *slk;
        struct linklist *llp;
        short off1, offs, other, zrid;
        char str[128];
        unsigned char class, flags;
        int lastorient, samel;
        long currname;
        struct c1p *currlf, *currrt;
        unsigned char currclass;
        struct graph *g, *cn;
        struct component *cmp;
        struct submodel *smsave;
        long chain1[200];       /* chain of 1-cells in child */
        int nchain1;
/*
 *
 */
        smsave = curr;
        curr = sm;
        c = newcarr();
        c->cy_id = id;
/*
```

```
_DUA0:[MARV.PATENT]SMT    RR.C;1     Sheet 2 of 5        Page 77

* 1-cells
 */
        for (p1=curr->clhead; p1!=NULL; p1=p1->nextcl) {
                        char *cp;
        /*
         * zero entire entry
         */
                        cp = (char *) &o;
                        for (i=0; i<sizeof (o); ++i)  cp[i] = 0;
        /*
         * from 0-cell
         */
                        p0 = find0(p1->cl.from);
                        if (p0 != NULL) {
                                z.zr_x = -(CARRSCLXY * p0->c0.x);
                                z.zr_y = CARRSCLXY * p0->c0.y;
                                z.zr_z = CARRSCLZ * p0->c0.z;
                                z.zr_extid = p0->c0.c0id;
                                o.on_fr = cy0ckadd(c, &z);
                                /* show0cy(&z, stdout); */
                                if (o.on_fr == 0)
                                        printf(stderr, "Can't add 0-cell %s\n",
                                                                str);
                        }
                        else {
                                printf(stderr, "Can't find 0-cell %ld\n",
                                                                p1->cl.from);
                                o.on_fr = 0;
                        }
                        currname = p1->cl.name;
                        currclass = p1->cl.class;
        /*
         *
         */
                        bkn.nbk = 0;
                        appndl(p1, 1, &bkn);
        /*
         * To 0-cell
         */
                        p0 = find0(p1->cl.to);
                        if (p0 != NULL) {
                                z.zr_x = -(CARRSCLXY * p0->c0.x);
                                z.zr_y = CARRSCLXY * p0->c0.y;
                                z.zr_z = CARRSCLZ * p0->c0.z;
                                z.zr_extid = p0->c0.c0id;
                                o.on_to = cy0ckadd(c, &z);
                                /* show0cy(&z, stdout); */
                                if (o.on_to == 0)
                                        printf(stderr, "Can't add 0-cell %s\n",
                                                                str);
                        }
                        else {
                                printf(stderr, "Can't find 0-cell %ld\n", p1->cl.to);
                                o.on_to = 0;
                        }
        /*
         * 2-cells
         */
```

```
                    o.on_lf = 0;
                    p2 = find2(p1->c1.left);
                    if (p2 != NULL) {
                            t.tw_carry = 0;
                            t.tw_extid = p2->c2.c2id;
                            o.on_lf = cy2ckadd(c, &t);
                            if (o.on_lf == 0)
                                    printf(stderr, "Can't add 2-cell %s\n",
                                                                    str);
                    }
                    /* Right side */
                    o.on_rt = 0;
                    p2 = find2(p1->c1.right);
                    if (p2 != NULL) {
                            t.tw_carry = 0;
                            t.tw_extid = p2->c2.c2id;
                            o.on_rt = cy2ckadd(c, &t);
                            if (o.on_rt == 0)
                                    printf(stderr, "Can't add 2-cell %s\n",
                                                                    str);
                    }
                    /* External id */
                    o.on_extid = p1->c1.clid;
                    switch (p1->c1.class) {
                        case '1': case '2': case '3': case '4': case '5':
                        case 'A': case 'B': case 'C': case 'D': case 'E':
                        case 'B': case '9': case 'F': case 'N': case 'P':
                        case 'R': case 'S': case 'U': case 'Z': case '6':
                            class = p1->c1.class;
                            break;
                        default:
                            class = '5';
                    }
                    flags = 0;
        /*
         * Names and addresses
         */
                    if (p1->c1.name1 ) 0) {
                            frd(chnfile, p1->c1.name1,
                                                    &chn, CHNSIZE);
                            strxfr(str, sizeof(str)-1,
                                            chn.name,
                                                    sizeof(chn.name));
                            strtrim(str, sizeof(chn.name));
                            name[0] = cyaddtxt(c, str);
                            nname = 1;

o.on_addr = cyaddr(c,p1,o);
/*                  }
/**/
                    }
                    else
                            nname = 0;
                    offl=cyaddl(c, &o, name, nname, class,
                                            flags, p1->c1.name1);
                    if (offl == 0)
                            fprintf(stderr, "Can't add 1-cell %s\n", str);
                    else {
```

```
                        op = (struct one_dat *)((char *)c + off1);
            } /* end of else for cyaddl */
    /*
     * Shape chain
     */
                prior = NULL;
                dougpk(&bkn, 5.0);      /* generalize */
                for (i=1; i<(bkn.nbk-1); ++i) {
                        if (bkn.keepbk[i]) {
                                s.sp_x = -(CARRSCLXY * bkn.xbk[i]);
                                s.sp_y = CARRSCLXY * bkn.ybk[i];
                                s.sp_z = CARRSCLZ * 0;   /* zero for now */
                                offs = cyaddshp(c, op, prior, &s);
                                prior = (struct shp_dat *)((char *)c + offs);
                                if (offs == 0) {
                                        fprintf(stderr,
                                                "Can't add shape 1-cell %ld\n",
                                                op->on_id);
                                        i = p1->cl.nshp + 1;   /* force exit */
                                }
                        }
                }
        } /* end of loop for 1-cells */
        curr = smsave;
        return(c);
}
/*                                                                          */
/****************************************************************************/
/*                                                                          */
                                                                /* func_name */
chksplit(cy, class, p0)
struct carrier *cy;
unsigned char class;
struct c0cell *p0;
{
        struct c1cell *p1;
        long namid;
        struct submodel *savsm;
        savsm = curr;
        curr = newsub();
        struts(p0->c0.c0id);
        for (p1=curr->c1head; p1!=NULL; p1=p1->nextcl) {
                namid = 0;
                if (p1->cl.class < class) {
                        if (namid == 0)
                                namid = p1->cl.namel;
                        if (namid != p1->cl.namel) {
                                currclr();
                                free(curr);
                                curr = savsm;
                                return(1);
                        }
                }
        }
        currclr();
        free(curr);
        curr = savsm;
        return(0);
}
```

```
cyaddr(carr,p1,oncy)                                             /* func_name */
struct carrier *carr;
struct c1cell  *p1;
struct one_dat oncy;

{
struct  adr_dat *adr;
struct  chnrec  chn;
char    str[40];
int     off;

off = cyalloc(carr, sizeof(struct adr_dat));
    if (off == 0)
        return(0);
    adr = (struct adr_dat *) ((char *)carr + off);
    adr->ad_1cell = oncy.on_id;            /* reverse ptr         */
    adr->ad_tl = p1->c1.addrtl;            /* copy the addresses  */
    adr->ad_tr = p1->c1.addrtr;
    adr->ad_fl = p1->c1.addrfl;
    adr->ad_fr = p1->c1.addrfr;
    return(off);
/*  }                                                             */
}
```

```
/********************************************************/
/*                                                      */
/* Build ancestors for already built and linked leaves  */
/* This simultaneously builds the complex X' of gener-  */
/* alized n-cells and builds the carrier blocks for     */
/* them.                                                */
/*                                    M. White          */
/*                                                      */
/********************************************************/
#include <stdio.h>
include <ctype.h>
#include <rms.h>
#include "[sources.include]dio.h"
#include "[sources.include]defs.h"
#include "[sources.include]carrier.h"
#include "[sources.include]carrext.h"
main(argc, argv)
int argc;
char *argv[];
{
        struct carrier *cy, *carry[MAXCARR], *buildcarr();
        char ans[80], *sel[25], pltr;
        int contin, status;
        FCB cyfcb;
        double xmin, xmax, ymin, ymax;
        long seed, max2;
        int minx, miny, maxx, maxy, count;
        int i, j, fd, rtn;
        char fname[80], *malloc();
        short carrid;              /* current carrier id */
        printf("Carrier construction\n\n");
        carry[0] = malloc(sizeof(struct carrier));
        status = dopen(&cyfcb, "carrier.dat", (MODE_WRITE | MODE_EXCLU));
        if (status) {
                fprintf(stderr,"** ERROR dopen status %04X\n", status);
                exit(status);
        }
        status = kread(&cyfcb, carry[0], sizeof(struct carrier), 0);
        if (status) {
                fprintf(stderr,"** ERROR kread status %04X\n", status);
                exit(status);
        }
        carrid = carry[0]->cy_id;
        printf("There are %d leaf carriers\n", carrid);
/*
 * read a few in
 */
        for (i=1; i<MAXCARR; i++)
                carry[i] = NULL;         /* initialize */
        for (i=2; (i<MAXMEM+2) && (i=carry[0]->cy_id); ++i) {
                carry[i] = malloc(sizeof(struct carrier));
                status = kread(&cyfcb, carry[i], sizeof(struct carrier), 0);
                if (status) {
                        fprintf(stderr,"** ERROR kread status %04X\n", status);
                        exit(status);
                }
        }
        ++carrid;        /* point to next */
```

_DUA$:[MARV.PATENT]BU  )ANC.C;1    Sheet 2 of 2    Page 82

```
        carrid = ancestors(carry, carrid, &cyfcb);
        carry[1] = carry[carrid-1];    /* point to eldest */
        for (i=1; i<carrid; ++i) {
                writecarr(carry, i, &cyfcb);
        }
        printf("Done\n");
        status = dclose(&cyfcb);
        if (status) {
                fprintf(stderr,"** ERROR dclose status %04X\n", status);
                exit(status);
        }
}
```

```
_DUA0:[MARV.PATENT. .CESTOR.C;1    Sheet 1 of 7      Page 83

/*******************************************************/
/*                                                     */
/*  Compute carrier tree by starting with children and */
/*  creating parents, grandparents, etc.               */
/*                                                     */
/*                                       M. White      */
/*                                                     */
/*******************************************************/
#include <stdio.h>
#include <rms.h>
#include "[sources.include]dio.h"
#include "[sources.include]carrier.h"
/*                                                     */
/*******************************************************/
/*                                                     */
int windosz(cy)
struct carrier *cy;
{
        int n, dx, dy;
        dx = cy->cy_wndw[1] - cy->cy_wndw[0];
        dy = cy->cy_wndw[3] - cy->cy_wndw[2];
        if (dx > dy)
                n = dx;
        else
                n = dy;
        n >>= cy->cy_general;
        return(n);
}
/*                                                     */
/*******************************************************/
/*                                                     */
/*  Percent overlap of windows                         */
int windovlp(cy1, cy2)
struct carrier *cy1, *cy2;
{
int n, xmin, xmax, ymin, ymax;
double dx, dy, a1, a2, small, aovlp;
        /* minimum x for overlap */
        if (cy1->cy_wndw[0] > cy2->cy_wndw[0])
                xmin = cy1->cy_wndw[0];
        else
                xmin = cy2->cy_wndw[0];
        /* maximum x for overlap */
        if (cy1->cy_wndw[1] > cy2->cy_wndw[1])
                xmax = cy2->cy_wndw[1];
        else
                xmax = cy1->cy_wndw[1];
/*
 * Check for no overlap
 */
        if (xmin >= xmax)
                return(0);
        /* minimum y for overlap */
        if (cy1->cy_wndw[2] > cy2->cy_wndw[2])
                ymin = cy1->cy_wndw[2];
        else
                ymin = cy2->cy_wndw[2];
        /* maximum y for overlap */
```

_DUA0:[MARV.PATENT]ANCESTOR.C;1   Sheet 2 of 7   Page 84

```
        if (cy1->cy_wndw[3] > cy2->cy_wndw[3])
                ymax = cy2->cy_wndw[3];
        else
                ymax = cy1->cy_wndw[3];
/*
 * Check for no overlap
 */
        if (ymin >= ymax)
                return(0);
/*
 * Calculate overlap area
 */
        dx = xmax - xmin;
        dy = ymax - ymin;
        aovlp = dx * dy;
/*
 * Calculate areas of each carrier
 */
        dx = cy1->cy_wndw[1] - cy1->cy_wndw[0];
        dy = cy1->cy_wndw[3] - cy1->cy_wndw[2];
        a1 = dx * dy;
        dx = cy2->cy_wndw[1] - cy2->cy_wndw[0];
        dy = cy2->cy_wndw[3] - cy2->cy_wndw[2];
        a2 = dx * dy;
        if (a1 < a2)
                small = a1;
        else
                small = a2;
/*
 * Return percent overlap
 */
        if (small > 0.0)
                n = 1000 * (aovlp / small);
        else
                n = 1000;
        return(n);
}
/*                                                              */
/****************************************************************/
/*                                                              */
/* Find sibling for current children - look across bdys*/
/* (= threshclass for sibling nearest (xc,yc)           */
/*                                                              */
int findsib(cyp, ncy, cylist, usedcy, xc, yc, cyfcb, age, score)
struct carrier *cyp, *cylist[];
int ncy;
char *usedcy, *age;      /* flag marking used carriers */
long xc, yc;             /* center of parent */
FCB *cyfcb;
int *score;              /* return evaluation score */
{
        struct chn_dat *ch;
        struct carrier *cyc, *cyx, *cyz;
        struct two_dat *tw;
        unsigned char topcls;    /* highest class encountered */
        short off, off2, offch, cand[100], ovlp[100], ncand, n, most;
        int i, j, k;
        double best, dist2, xc2, yc2;
```

```
        j = 0;
        best = -1;
        ncand = 0;
/*
 * Find neighbor across bdy with most overlap.  Bias score with classif
 */
        for (off2=cyp->cy_hd2; off2)0; off2=tw->tw_next) {
                /* scan through all children */
                tw = (char *)cyp + off2;
                k = tw->tw_carry;
                rollin(cylist, k, ncy, cyfcb, age);
                cyx = cylist[k];
                if (cyx->cy_id != k)
                        printf("*** rollin error %5d should be %5d\n",
                                cyx->cy_id, k);
                for (offch=cyx->cy_hdchn; offch)0; offch=ch->ch_next) {
                        ch = (char *)cyx + offch;
                        i = ch->ch_other;
                        if (!usedcy[i]) {
                                for (n=0; (n<ncand)&&(cand[n]!=i); ++n) ;
                                if (n == ncand) {
                                        /* new candidate */
                                        cand[n] = i;
                                        rollin(cylist, i, ncy, cyfcb, age);
                                        cyz = cylist[i];
                                        ovlp[n] = windovlp(cyz, cyp);
                                        switch (slamclass(ch->ch_class)) {
                                            case 'Z': ovlp[n] += 10000; break;
                                            case '9': ovlp[n] += 9000; break;
                                            case '5': ovlp[n] += 5000; break;
                                            case '4': ovlp[n] += 4000; break;
                                            case '3': ovlp[n] += 3000; break;
                                            case '2': ovlp[n] += 2000; break;
                                            case '1': ovlp[n] += 1000; break;
                                            default: ;
                                        }
                                        ++ncand;
                                }
                        }
                }
        }
        j = most = 0;
        for (n=0; n<ncand; ++n) {
                if (ovlp[n] ) most) {
                        j = cand[n];
                        most = ovlp[n];
                }
        }
        if (j != 0)
        *score = most;
        return(j);
}
/*                                                                  */
/********************************************************************/
/*                                                                  */
/* Parent amoeba program - assimilate carriers at a                 */
/* level (siblings) and use their boundaries to create              */
/* the parent.                                                      */
```

_DUA0:[MARV.PATENT]ANCESTOR.C;1    Sheet 4 of 7    Page 86

```
/*                                                         */
struct carrier *paramoeb(seed, cylist, ncy, usedcy, seency, level, cyfcb, age)
int seed, ncy,                  /* subscripts into cylist */
        level;                  /* level of generalization */
struct carrier *cylist[];       /* list of carriers */
char *usedcy, *seency, *age;            /* flags */
FCB *cyfcb;
{
        struct carrier  *cyp,   /* parent */
                        *cyc,   /* child */
                        cyhold; /* backup to cover for overflow */
        struct chn_dat *ch;
        struct two_dat *td;
        short off, unuse[100], junuse;
        unsigned char threshcls;        /* threshold class */
        long    xc, yc;         /* center point */
        int i, j, n, szthresh, score, markplc, threshscr, sizeok, wndwok;
/*
 * Initialize parent with child
 */
        szthresh = 9216;        /* limit size to produce ( 4k cassette blks */
        cyp = newcarr();
        cyp->cy_general = level;
        cyp->cy_id = ncy;
        rollin(cylist, seed, ncy, cyfcb, age);
        cyc = cylist[seed];
        if (cyc->cy_id != seed)
                printf("*** rollin error %5d should be %5d\n",
                        cyc->cy_id, seed);
        xc = (cyc->cy_wndw[0] + cyc->cy_wndw[1]) / 2;
        yc = (cyc->cy_wndw[1] + cyc->cy_wndw[2]) / 2;
        i = seed;
/*
 * Compute threshold class for boundary
 */
        switch (level) {
                case 0: threshcls = '5'; break;
                case 1: threshcls = '4'; break;
                case 2: threshcls = '3'; break;
                case 3: threshcls = '2'; break;
                case 4: threshcls = '1'; break;
                default: threshcls = '\0';
        }
        threshscr = 100000;     /* threshold for score from findsib */
/*
 * Keep expanding the family until parent is full
 */
        markplc = 1;            /* flag to mark place */
        n = 0;                  /* number of children */
        while (cyc!=NULL) {
                if (markplc) {
                        cyhold = *cyp;  /* VAX / VMS assign */
                        junuse = 0;     /* subscript into unuse array */
                }
                cyparent(cyp, cyc, threshcls);
                n++;
                if ((sizeok=(sizecarr(cyp) < szthresh) &&
                    (wndwok=(windosz(cyp))>cyp->cy_general) < WNDWMAX)) ||
```

```
                        (n==1) ){
                                usedcy[i] = 1;
                                unuse[junuse++] = i;    /* remember incase revert to prior */
                                /* mark adjacent siblings as seen */
                                for (off=cyc->cy_hdchn; off)0; off=ch->ch_next) {
                                        ch = (char *)cyc + off;
                                        if (ch->ch_other ) 0) {
                                                seency[ch->ch_other] = 1;
                                        }
                                }
                                i = findsib(cyp, ncy, cylist, usedcy,
                                            xc,yc, cyfcb, age, &score);
                                if (i ) 0) {
                                        rollin(cylist, i, ncy, cyfcb, age);
                                        cyc = cylist[i];
                                        if (cyc->cy_id != i)
                                                printf("*** rollin error %5d should be %5d\n",
                                                        cyc->cy_id, i);
                                        markplc = (score (= threshscr);
                                        score = (score/1000) * 1000 + 999;
                                        if (threshscr ) score) threshscr = score;
                                }
                                else
                                        cyc = NULL;
                        }
                        else {
                                /* backup 1 stage */
                                *cyp = cyhold;    /* VAX / VMS assign */
                                for (j=0; j(junuse; j++) {
                                        usedcy[unuse[j]] = 0;    /* not used after all */
                                }
                                cyc = NULL;
                        }
                }
/*
 * List children kept
 */
        n = 0;
        printf("Carrier %6d has %6d bytes and children::\n",
                cyp->cy_id, sizecarr(cyp));
        for (off=cyp->cy_hd2; (off)0); off=td->tw_next) {
                td = (struct two_dat *)((char *)cyp + off);
                n++;
                printf(" %5d", abs(td->tw_id));
                if ((n%10) == 0) printf("\n");
        }
        printf("\n");

if (!sizeok) printf("Carrier %6d hit byte barrier\n", cyp->cy_id);
        if (!wndwok) printf("Carrier %6d hit window\n", cyp->cy_id);
        cylist[ncy] = cyp;
        age[ncy] = 0;
        ncy++;
/*
 * keep number of carriers in memory constant - free oldest
 */
        free(swapold(cylist, ncy, cyfcb, age));
        return(ncy);
}
```

```c
/*
 *
 *****************************************************/
/*
int ancestors(cylist, ncy, cyfcb)
struct carrier *cylist[];
int ncy;
FCB *cyfcb;
{
        char *usedcy, *seency, *age;
        long window[MAXCARR][4];
        int first, next, i, k, seed, level, bdysplit();
        printf("ancestors for %4d carriers \n", ncy);
        usedcy = malloc(MAXCARR);
        seency = malloc(MAXCARR);
        age    = malloc(MAXCARR);
        for (i=0; i<(MAXCARR); ++i) {
                /* initialize flags */
                usedcy[i] = seency[i] = 0;
                age[i] = 1;
        }
/*
 * mark outer boundary as used and save 1 for descriptor
 */
        usedcy[0] = usedcy[1] = 1;
        next = ncy;
        first = 2;
        level = 0;              /* level of generalization */
        while (((next-first) > 1) && (ncy < MAXCARR)) {
                ++level;
                seed = first;
                for (i=first; i<next; ++i)
                        seency[i] = 0;  /* reset the adjacency flags */
                while ((seed > 0) && (ncy < MAXCARR)) {
                        ncy = paramoeb(seed, cylist, ncy,
                                        usedcy, seency, level, cyfcb, age);
                        rollin(cylist, ncy-1, ncy, cyfcb, age);
                        window[ncy-1][0] = cylist[ncy-1]->cy_wndw[0];
                        window[ncy-1][1] = cylist[ncy-1]->cy_wndw[1];
                        window[ncy-1][2] = cylist[ncy-1]->cy_wndw[2];
                        window[ncy-1][3] = cylist[ncy-1]->cy_wndw[3];
                        /* split chains into bdy and interior */
                        while (bdysplit(cylist[ncy-1])) ;      /* keep splitting until ok *
                        for (i=next; i<ncy-1; ++i) {
                                if (overlap(window[ncy-1], window[i])) {
                                        rollin(cylist, ncy-1, ncy, cyfcb, age);
                                        rollin(cylist, i, ncy, cyfcb, age);
                                        linksib(cylist[ncy-1], cylist[i]);
                                }
                        }
                        seed = 0;
                        for (i=first; (seed==0)&&(i<next); ++i) {
                                if (!usedcy[i] && seency[i])
                                        seed = i;
                        }
                        if (seed==0)
                                printf("No more adjacent carriers\n");
                        if (seed == 0)
```

```
                    printf("End of carriers at level %d\n",
                            level);
        }
        printf("End of family   first= %d  next= %d\n", first, next);
        first = next;
        next = ncy;
        for (i=2; i<ncy; i++)
                writecarr(cylist, i, cyfcb);    /* clear buffers */
    }
    if (ncy >= MAXCARR)
        fprintf(stderr,"** Number of carriers %d reached max %d\n",
                ncy, MAXCARR);
    return(ncy);
}
``` nd_prts.c                              Sheet 1 of 1    Page 90

```
001   /*********************************************************
002    *
003    *
004    *      FND_PRTS.C       George Loughmiller
005    *
006    *
007    *   This function stores a pointer to the parent of the carrrier.
008    *   The parent carrier is always the first in the list.  The list of
009    *   carrier pointers is terminated by a null before returning.  Since
010    *   this routine is called by the general search routine fnd_blks, it
011    *   returns a zero to keep this carrier from being included in the
012    *   fertilization data; i.e., only those carriers which are searched
013    *   for siblings are to be part of the fertilizer.  (See the
014    *   description of routine fnd_blks for more details.)
015    *
016    *   1984 ETAK, Inc.
017    *
018    **********************************************************/
019
020
021   #include "carnvdef.gel"
022   #include "carnvdef.ct"
023
024   fnd_prts(pheadr, cr_ptrs)
025   struct hd_dat *pheadr;                    /* address of carrier header */
026   struct cr_dat *cr_ptrs[];                 /* array of carrier pointers */
027   {
028         *cr_ptrs++ = (char *) pheadr + pheadr->hd_offcr;
029         return(*cr_ptrs = 0);
030   }
``` fnd_kids.c                              Sheet 1 of 4    Page 91

```
0001    /*****************************************************************
0002    *                                                                *
0003    *                                                                *
0004    *       FND_KIDS.C       George Loughmiller                      *
0005    *                                                                *
0006    *                                                                *
0007    *   This function searches a carrier finding the children which are *
0008    *   in the data base region.  For each kid found, a pointer to that *
0009    *   carrier is returned in the array cr_ptrs.  The data base region *
0010    *   is a rectangle defined by a center position and offsets from the *
0011    *   center to the four sides.  A carrier is included in the returned *
0012    *   list if any of its segments is contained within or intersects the *
0013    *   rectangular region.  The status (pending, included, or excluded) *
0014    *   of each carrier is initialized and updated as the seach of     *
0015    *   segments proceeds such that segments bounding carriers no longer *
0016    *   pending can be bypassed.  To handle the situation where the data *
0017    *   base region is completely within the interior of one carrier  *
0018    *   (i.e., the carrier needs to be included, but all of its segments *
0019    *   are outside of the data base region), a count of the number of *
0020    *   intersections with a semi-infinite line along the left edge of *
0021    *   the data base region is maintained for each carrier until a   *
0022    *   segment has been found inside of the data base region.  If at the *
0023    *   end of the search a segment has not been found within the data *
0024    *   base region, the count for each carrier is checked until a    *
0025    *   carrier with an odd number of intersections is found and a single *
0026    *   pointer to that carrier is returned.  The list of carrier     *
0027    *   pointers is terminated by a null before returning.  Since this *
0028    *   routine is called by the general search routine fnd_blks, it  *
0029    *   returns a zero to keep this carrier from being included in the *
0030    *   fertilization data; i.e., only those carriers which are searched *
0031    *   for siblings are to be part of the fertilizer.  (See the       *
0032    *   description of routine fnd_blks for more details.)             *
0033    *                                                                *
0034    *   1984 ETAK, Inc.                                              *
0035    *                                                                *
0036    *****************************************************************
0037
0038
0039    #include "carnvdef.ct"
0040    #include "carnvdef.qel"
0041    #include "errdefs.c"
0042
0043    fnd_kids(pheadr, cr_ptrs)                   /* address of carrier */
0044    struct hd_dat *pheadr;                      /* array of carrier pointers */
0045    struct cr_dat *cr_ptrs[];
0046    {
0047        extern struct position db_pos;          /* center of db region */
0048        extern int blk_fnd;                     /* block found flag */
0049        extern int db_left;                     /* left boundary of region */
0050        extern int db_right;                    /* right boundary of region */
0051        extern int db_bot;                      /* bottom boundary of region */
0052        extern int db_top;                      /* top boundary of region */
0053        extern int err_stat;                    /* error message number */
0054        extern char err_msg[];                  /* error message */
0055        extern char *emsgs[];                   /* array of error messages */
``` fnd_kids.c                                      Sheet 2 of 4    Page 92

```
0056
0057            struct bl_dat blocks[MAX_BLKS];       /* status of blocks */
0058            struct bd_dat *bndy;                  /* address of boundary array */
0059            struct bd_dat *pbndy;                 /* pointer to next boundary */
0060            struct bd_dat *pend_bd;               /* pointer to last boundary */
0061            struct st_dat *streets;               /* address of street array */
0062            struct st_dat *pstreet;               /* pointer to next street */
0063            struct st_dat *pend_st;               /* pointer to last street */
0064            struct cr_dat *carriers;              /* address of carrier array */
0065            struct cr_dat *pcarrier;              /* pointer to next carrier */
0066            struct nd_dat *nodes;                 /* address of nodes array */
0067            struct nd_dat *pnode;                 /* pointer to next node */
0068            struct nd_dat *pend_nd;               /* pointer to last node */
0069            struct bl_dat *pleft;                 /* pointer to left block */
0070            struct bl_dat *pright;                /* pointer to right block */
0071            int icarrier;                         /* index to carrier array */
0072            int ncarrier;                         /* number of sub carriers */
0073            int nblk_pnd;                         /* number of pending blocks */
0074            int nblk_rtn;                         /* number of blocks found */
0075            int dist;                             /* distance of xing above box *,
0076            int x1;                               /* x value of "from" node */
0077            int y1;                               /* y value of "from" node */
0078            int x2;                               /* x value of "to" node */
0079            int y2;                               /* y value of "to" node */
0080
0081            if ((ncarrier = pheadr->hd_ncary) >= MAX_BLKS) {
0082                sprintf(err_msg, emsgs[err_stat = EM_MXBLS]);
0083                return(*cr_ptrs = 0);
0084            }
0085            for (icarrier = 1; icarrier <= ncarrier; icarrier++)
0086                blocks[icarrier].bl_stat = 0;
0087            blocks[0].bl_stat = blocks[1].bl_stat = 2;
0088            nblk_pnd = ncarrier - 1;
0089            pbndy = bndy = (char *) pheadr + pheadr->hd_offbd;
0090            pend_bd = pbndy-- + pheadr->hd_nbndy;
0091            while (++pbndy < pend_bd) {
0092                if (!((pleft = &blocks[(int) (pbndy->bd_left)])->bl_stat)) {
0093                    pleft->bl_stat = 2;
0094                    nblk_pnd--;
0095                }
0096            }
0097            pcarrier = carriers = (char *) pheadr + pheadr->hd_offcr;
0098            for (icarrier = 1; icarrier <= ncarrier && nblk_pnd; icarrier++) {
0099                if (!blocks[icarrier].bl_stat) {
0100                    if ((int) (pcarrier->cr_xmax - db_pos.x) < db_left ||
0101                        (int) (pcarrier->cr_xmin - db_pos.x) > db_right ||
0102                        (int) (pcarrier->cr_ymax - db_pos.y) < db_bot ||
0103                        (int) (pcarrier->cr_ymin - db_pos.y) > db_top) {
0104                        blocks[icarrier].bl_stat = 2;
0105                        nblk_pnd--;
0106                    }
0107                    else
0108                        blocks[icarrier].bl_nxing = 0;
0109                }
0110                pcarrier++;
``` nd_kids.c                                    Sheet 3 of 4    Page 93

```
3111        }
3112        if (!nblk_pnd) return(*cr_ptrs = 0);
3113        blk_fnd = 0;
3114        pstreet = streets = (char *) pheadr + pheadr->hd_offst;
3115        pend_st = pstreet-- + pheadr->hd_nstrt;
3116        nodes = (char *) pheadr + pheadr->hd_offnd;
3117        while (++pstreet < pend_st && nblk_pnd) {
3118            pnode = (char *) nodes + pstreet->st_offnd;
3119            pend_nd = pnode + pstreet->st_ndcnt;
3120            x2 = pnode->lf_x - db_pos.x;
3121            y2 = pnode->lf_y - db_pos.y;
3122            while (++pnode < pend_nd && nblk_pnd) {
3123                x1 = x2;
3124                y1 = y2;
3125                x2 = pnode->lf_x - db_pos.x;
3126                y2 = pnode->lf_y - db_pos.y;
3127                if (blocks[(int) (pnode->nd_left)].bl_stat &&
3128                    blocks[(int) (pnode->nd_right)].bl_stat) continue
3129                pleft = &blocks[(int) (pnode->nd_left)];
3130                pright = &blocks[(int) (pnode->nd_right)];
3131                if (blk_fnd) {
3132                    if (!seg_out(x1, y1, x2, y2)) {
3133                        if (!pleft->bl_stat) {
3134                            pleft->bl_stat = 1;
3135                            nblk_pnd--;
3136                        }
3137                        if (!pright->bl_stat) {
3138                            pright->bl_stat = 1;
3139                            nblk_pnd--;
3140                        }
3141                    }
3142                }
3143                else {
3144                    switch (seg_out(x1, y1, x2, y2, &dist)) {
3145                        case 0:
3146                            blk_fnd = 1;
3147                            if (!pleft->bl_stat) {
3148                                pleft->bl_stat = 1;
3149                                nblk_pnd--;
3150                            }
3151                            if (!pright->bl_stat) {
3152                                pright->bl_stat = 1;
3153                                nblk_pnd--;
3154                            }
3155                            break;
3156                        case 1:
3157                            if (x2 > db_left) {
3158                                pleft->bl_nxing++;
3159                                pright->bl_nxing++;
3160                            }
3161                            break;
3162                        case 2:
3163                            if (x1 > db_left) {
3164                                pleft->bl_nxing++;
3165                                pright->bl_nxing++;
``` fnd_kids.c

```
0166                                    }
0167                                    break;
0168                            case 3:
0169                                    pleft->bl_nxing++;
0170                                    pright->bl_nxing++;
0171                                    break;
0172                            }
0173                    }
0174            }
0175    }
0176    nblk_rtn = 0;
0177    pcarrier = carriers;
0178    if (blk_fnd) {
0179            for (icarrier = 1; icarrier <= ncarrier; icarrier++) {
0180                    if (blocks[icarrier].bl_stat == 1) {
0181                            *cr_ptrs++ = pcarrier;
0182                            nblk_rtn++;
0183                    }
0184                    pcarrier++;
0185            }
0186    }
0187    else {
0188            for (icarrier = 1; icarrier <= ncarrier; icarrier++) {
0189                    if (!blocks[icarrier].bl_stat &&
0190                        blocks[icarrier].bl_nxing %2) {
0191                            *cr_ptrs++ = pcarrier;
0192                            nblk_rtn = 1;
0193                            break;
0194                    }
0195                    pcarrier++;
0196            }
0197    }
0198    return(*cr_ptrs = 0);
0199 }
```

```
d_sibs.c                              Sheet 1 of 4    Page 95

01  /****************************************************************
02  *                                                                *
03  *                                                                *
04  *      FND_SIBS.C      George Loughmiller                        *
05  *                                                                *
06  *                                                                *
07  *   This function searches a carrier finding the siblings which are *
08  *  in the data base region.  For each sibling found, a pointer to *
09  *  that carrier is returned in the array cr_ptrs.  In addition, the *
10  *  status of this carrier (included or excluded) is returned.  The *
11  *  data base region is a rectangle defined by a center position and *
12  *  offsets from the center to the four sides.  A sibling is included *
13  *  in the returned list if it is the neighboring carrier along a *
14  *  boundary segment which is contained within or intersects the *
15  *  rectangular region.  In addition, if any segment bounding the *
16  *  edge of the data base is contained within or intersects the *
17  *  rectangular data base region, the "close to edge of map" flag is *
18  *  set.  The status (pending, included, or excluded) of each carrier *
19  *  is initialized and updated as the seach of boundary segments *
20  *  proceeds such that streets bounding carriers no longer pending *
21  *  can be bypassed.   To handle the situation where the data base *
22  *  region is completely within the interior of this carrier (i.e., *
23  *  this carrier needs to be included, but all of its boundary *
24  *  segments are outside of the data base region), a count of the *
25  *  number of intersections with a semi-infinite line along the left *
26  *  edge of the data base region is maintained until a boundary *
27  *  segment has been found inside of the data base region.  At the *
28  *  end of the search, the list of carrier pointers is terminated by *
29  *  a null, and if a boundary segment has been found within the data *
30  *  base region, a one is returned indicating that this carrier *
31  *  is to be included.  Otherwise, the intersection count is checked. *
32  *  If the count is an odd number, this carrier must completly *
33  *  inclose the data base region; hence, a one is returned indicating *
34  *  that this carrier is to be included.  Otherwise, this carrier *
35  *  must be completly exterior to the data base region; hence, a two *
36  *  is returned indicating that this carrier is to be excluded. *
37  *                                                                *
38  *  1984 ETAK, Inc.                                               *
39  *                                                                *
40  ****************************************************************/
41
42
43  #include "carnvdef.ct"
44  #include "carnvdef.gel"
45  #include "errdefs.c"
46
47  fnd_sibs(pheadr, cr_ptrs)              /* address of carrier header */
48  struct hd_dat *pheadr;                 /* array of carrier pointers */
49  struct cr_dat *cr_ptrs[];
50  {
51      extern struct position db_pos;     /* center of db region */
52      extern int db_left;                /* left boundary of region */
53      extern int db_right;               /* right boundary of region */
54      extern int db_bot;                 /* bottom boundary of region */
55      extern int db_top;                 /* top boundary of region */
``` fnd_sibs.c                              Sheet 2 of 4    Page 96

```
0056        extern int blk_fnd;                 /* block found flag */
0057        extern int err_stat;                /* error message number */
0058        extern unsigned char on_edge;       /* close to edge of db flag */
0059        extern char err_msg[];              /* error message */
0060        extern char *emsgs[];               /* array of error messages */
0061
0062        struct bl_dat blocks[MAX_BLKS];     /* status of blocks */
0063        struct bd_dat *bndy;                /* address of boundary array */
0064        struct bd_dat *pbndy;               /* pointer to next boundary */
0065        struct bd_dat *pend_bd;             /* pointer to last boundary */
0066        struct st_dat *streets;             /* address of streets array */
0067        struct st_dat *pstreet;             /* pointer to next street */
0068        struct cr_dat *carriers;            /* address of carrier array */
0069        struct cr_dat *pcarrier;            /* pointer to next carrier */
0070        struct nd_dat *nodes;               /* address of nodes array */
0071        struct nd_dat *pnode;               /* pointer to next node */
0072        struct bl_dat *pleft;               /* pointer to boundary block */
0073        int icarrier;                       /* index to carrier array */
0074        int ncarrier;                       /* number of sub carriers */
0075        int nblk_pnd;                       /* number of pending blocks */
0076        int dist;                           /* distance of xing above box */
0077        int nxing;                          /* xings with left edge */
0078        int x1;                             /* x value of "from" node */
0079        int y1;                             /* y value of "from" node */
0080        int x2;                             /* x value of "to" node */
0081        int y2;                             /* y value of "to" node */
0082        int incr;                           /* increment for node pointer */
0083        int nnodes;                         /* number of nodes */
0084
0085        carriers = (char *) pheadr + pheadr->hd_offcr;
0086        if ((int) (carriers->cr_xmax - db_pos.x) < db_left ||
0087            (int) (carriers->cr_xmin - db_pos.x) > db_right ||
0088            (int) (carriers->cr_ymax - db_pos.y) < db_bot ||
0089            (int) (carriers->cr_ymin - db_pos.y) > db_top) {
0090            *cr_ptrs = 0;
0091            return(2);
0092        }
0093        if ((ncarrier = pheadr->hd_ncary) >= MAX_BLKS) {
0094            sprintf(err_msg, emsgs[err_stat = EM_MXBLS]);
0095            *cr_ptrs = 0;
0096            return(1);
0097        }
0098        for (icarrier = 0; icarrier <= ncarrier; icarrier++)
0099            blocks[icarrier].bl_stat = 2;
0100        pbndy = bndy = (char *) pheadr + pheadr->hd_offbd;
0101        pend_bd = pbndy-- + pheadr->hd_nbndy;
0102        while (++pbndy < pend_bd)
0103            blocks[(int) (pbndy->bd_left)].bl_stat = 0;
0104        if (!blocks[0].bl_stat)
0105            nblk_pnd = 2;
0106        else
0107            nblk_pnd = 1;
0108        for (icarrier = 2, pcarrier = carriers + 1;
0109             icarrier <= ncarrier; icarrier++, pcarrier++) {
0110            if (blocks[icarrier].bl_stat) continue;
``` j_sibs.c        Sheet 3 of 4    Page 97

```
11          if ((int) (pcarrier->cr_xmax - db_pos.x) < db_left ||
12              (int) (pcarrier->cr_xmin - db_pos.x) > db_right ||
13              (int) (pcarrier->cr_ymax - db_pos.y) < db_bot ||
14              (int) (pcarrier->cr_ymin - db_pos.y) > db_top)
15              blocks[icarrier].bl_stat = 2;
16          else
17              nblk_pnd++;
18      }
19      blk_fnd = nxing = 0;
20      streets = (char *) pheadr + pheadr->hd_offst;
21      nodes = (char *) pheadr + pheadr->hd_offnd;
22      incr = (pheadr->hd_res & 0xBF) ? sizeof (struct nd_dat) :
23                                      sizeof (struct lf_dat);
24      pbndy = bndy - 1;
25      pstreet = streets - 1;
26      while (++pbndy < pend_bd && nblk_pnd) {
27          pstreet++;
28          pleft = &blocks[(int) (pbndy->bd_left)];
29          pnode = (char *) nodes + pstreet->st_offnd;
30          nnodes = pstreet->st_ndcnt;
31          x2 = pnode->lf_x - db_pos.x;
32          y2 = pnode->lf_y - db_pos.y;
33          while (--nnodes && !(blk_fnd && pleft->bl_stat)) {
34              pnode = (char *) pnode + incr;
35              x1 = x2;
36              y1 = y2;
37              x2 = pnode->lf_x - db_pos.x;
38              y2 = pnode->lf_y - db_pos.y;
39              switch (seg_out(x1, y1, x2, y2, &dist)) {
40                  case 0:
41                      if (!blk_fnd) {
42                          nblk_pnd--;
43                          blk_fnd = 1;
44                      }
45                      if (pleft->bl_stat) break;
46                      if (pbndy->bd_left) {
47                          nblk_pnd--;
48                          pleft->bl_stat = 1;
49                          *cr_ptrs++ = carriers +
50                                      (pbndy->bd_left - 1);
51                      }
52                      else if (near_edg(x1, y1,
53                                      x2, y2, pstreet)) {
54                          nblk_pnd--;
55                          pleft->bl_stat = 1;
56                          on_edge = 1;
57                      }
58                      break;
59                  case 1:
60                      if (x2 > db_left) nxing++;
61                      break;
62                  case 2:
63                      if (x1 > db_left) nxing++;
64                      break;
65                  case 3:
```

```
j_sibs.c                            Sheet 4 of 4    Page 98
56                                  nxing++;
57                                  break;
58                    }
59              }
70        }
71        *cr_ptrs = 0;
72        if (blk_fnd)
73              return(1);
74        else {
75              if (nxing % 2)
76                    return(1);
77              else
78                    return(2);
79        }
80  }
```

We claim:

1. Apparatus storing a representation of a topological structure having topological features, comprising:

a) a data storage medium; and b) a digital data base stored on said data storage medium, said digital data base including a plurality of carrier blocks of data representing the topological features at a given level of detail, said data of each one of said carrier blocks being a representation of a carrier which is a closed set including in its interior a given topological object, and wherein said closed set is a smallest closed set and is a sub-complex $X_i$ of a topological complex X, the sub-complex $X_i$ having a set of n-cells, where $0 \leq n \leq$ the dimension of the topological structure and the totality of said plurality of carrier blocks covers the topological complex X.

2. Apparatus, according to claim 1, wherein the areal coverage of the features of one portion of the topological structure provided by one said sub-complex $X_i$ of one said carrier block may be larger than the areal coverage of the features of another portion of the topological structure provided by another sub-complex $X_j$ of another said carrier block for $i \neq j$.

3. Apparatus, according to claim 2, wherein the size of each said carrier block of data is substantially the same as the size of each other said carrier block of data.

4. Apparatus, according to claim 3, wherein said data of each one of said carrier blocks are stored in bytes, and wherein the number of bytes in each said carrier block is substantially the same to provide said substantially the same size of carrier blocks.

5. Apparatus, according to claim 1, wherein said sub-complex $X_i$ has an interior which is disjoint from the interior of another sub-complex $X_j$ of said complex X for $i \neq j$, and wherein said sub-complexes $X_i$ and $X_j$ are topologically mutually adjacent having a common border.

6. Apparatus, according to claim 1, wherein n=0, 1 and 2.

7. Apparatus, according to claim 1, wherein the topological structure is a geographical area and wherein said digital data base corresponds to a map of the geographical area and said sub-complex $X_i$ represents a certain portion of the geographical area.

8. Apparatus, according to claim 1, wherein adjacent carriers have a common boundary and only one of the carrier blocks representing one of the adjacent carriers has data identifying said boundary.

9. A method of building a digital data base representing a given topological structure, using a programmed computer, the digital data base having first and second levels of carrier blocks of data that are topologically equivalent, each of said carrier blocks of said first level having a topological sub-complex $X_i$ corresponding to an element $A_i$ of a partition P at the first level, each said sub-complex $X_i$ having n-cells, where n=0, 1, 2 ..., and the 2-cells $c^2_i$ of the sub-complex $X_i$ being mutually adjacent, and where the totality of the carrier blocks of data of the first level constitute a topological complex X, and the totality of the carrier blocks of data of the second level constitute a topological complex X', comprising the steps of:

a) providing each said sub-complex $X_i$ on a data storage medium;

b) for each said sub-complex $X_i$, fusing all the 2-cells $c^2_i$ in one said sub-complex $X_i$ to form a single 2-cell $c'^2_i$;

c) identifying a 1-complex of 1-cells $c^1_i$ on the boundary of the single 2-cells $c'_{2i}$ and the 0-cells $c^0_i$ bounding those 1-cells $c^1_i$, where those 0-cells $c^0_i$ incident to t 1-cells $c^1_i$ are essential 0-cells $c^0_i$, where t=2;

d) constructing connected chains of 1-cells $c^1_i$ so that each chain $c^1_i$ is bounded by the essential 0-cells $c^0_i$, where these chains of 1-cells $c^1_i$ are common to adjacent sub-complexes $X_i$ or on the boundary of the entire complex X;

e) fusing each chain of 1-cells $c^1_i$ to form a 1-cell $c'^1_i$; and f) for each essential 0-cell $c^0_i$, creating a chain of 0-cells $c^0_k$ having a single 0-cell and mapping this chain into the 0-cell $c'^0_m$ as a copy of the essential 0-cell $c^0_i$, whereby the n-cells $c'^2_i$, $c'^1_i$ and $c'^0_m$ constitute the topological complex X'.

10. A method, according to claim 9, wherein the step of fusing each chain of 1-cells $c'_i$ comprises reducing the geometrical complexity of the 1-cells $c'^1_i$.

11. A method, according to claim 10, wherein the step of reducing comprises using a straightening algorithm.

12. A method, according to claim 9, further comprising iterating the steps a)–f) until a resulting topological complex X", X'" ... does not exceed a given complexity threshold.

13. A method, according to claim 12, wherein the step of iterating comprises the steps of:

a) initially providing the complex X';

b) creating a fused complex X" using the steps a)–e) of claim 9 and then storing the fused complex X";

c) determining if the stored complex X" exceeds a given complexity threshold; and d) if the given complexity threshold is exceeded by the complex X", setting X" as the initial complex and returning to step b) of claim 12.

14. A method of building a digital data base, representing a given topological structure, using a programmed computer, the digital data base corresponding to a complex X having a plurality of elements $A_i = \{c^2_j\}$ of a partition P and a plurality of n-cells corresponding to topological features of the topological structure, wherein n=0, 1, 2, comprising the steps of:

a) initializing a counter k;

b) selecting an arbitrary 2-cell $c^2_j$ in the complex X not already included in a prior element $A_i$ in the partition P;

c) incrementing the counter k and initializing a register $A_k$ storing element $A_k$ to store only the selected 2-cell $c^2_j$ of a sub-complex $X_k$;

d) adding all 1-cells and 0-cells incident to the selected 2-cells $c^2_j$ to provide a sub-complex $X_k$ being a topological closed set;

e) selecting another 2-cell $c^2_j$ in the complex X not already included in a prior element $A_i$ and adjacent a 2-cell $c^2_j$ in the sub-complex $X_k$;

f) testing whether adding the 2-cell $c^2_j$ selected in step e) and all 1-cells and 0-cells incident thereto to the sub-complex $X_k$ would cause the sub-complex $X_k$ to exceed a given threshold of complexity;

g) going to step h) or step i) if the test of step f) does not or does show, respectively, the given threshold being exceeded or not being exceeded;

h) adding the 2-cell $c^2_j$ tested in step f) to register $A_k$ and adjoining this 2-cell $c^2_j$ and all its incident 1-cells and 0-cells to keep the sub-complex $X_k$ a closed set;

i) returning to step e);

j) since element $A_k$ and sub-complex $X_k$ are complete, adding element $A_k$ to a register P storing the partition P and storing the sub-complex $X_k$; and k) going to step b) if there remains any 2-cell $c^2_j$ in some element $A_i$.

15. A method of searching a digital data base using a programmed computer, the digital data base having a hierarchy of levels of carrier blocks of data, each level in the hierarchy, constituting topological complexes X, X', X" ..., each of the complexes X, X', X" ... containing successively more generalized information and the complex containing the most generalized information being the root, each of the complexes X, X', X" ... constituting n-cells, where n=0, 1, 2 ... and the digital data base representing a topological structure, comprising the steps of:
   a) initializing a first list of selected cells and a second list of current carrier blocks;
   b) setting the second list to be the root;
   c) setting the current hierarchical level to be the root;
   d) selecting from the second list of current carrier blocks, the 0-cells, 1-cells and 2-cells that fall within a specified range from a point;
   e) exiting if the current hierarchical level is 0;
   f) replacing the second list of current carrier blocks with another list containing one carrier block for each 2-cell at the current level in the first list of selected cells, whereby each said one carrier block of said other list is at the next level of the hierarchy;
   g) decrementing the current level; and
   h) returning to step d).

16. A method of searching a digital data base using a programmed computer, the digital date base having a plurality of carrier blocks at a given level constituting a topological complex, each of the carrier blocks containing topological n-cells, comprising the steps of:
   a) initializing a first list of selected n-cells and a second list of current carrier blocks;
   b) setting the second list of current carrier blocks to be a given carrier block;
   c) selecting from the second list of current carrier blocks the n-cells that fall within a given range of a point;
   d) exiting if no n-cells selected in step c) is on a boundary of a carrier corresponding to the carrier block to output the first list of selected n-cells;
   e) for each n-cell in the first list, if the selected n-cell of step c) is on the boundary of a carrier and another carrier block corresponding to an adjacent carrier is not in the second list, adding that other carrier block to the second list; and
   f) returning to step c).

17. A method of searching a digital data base using a programmed computer, the digital data base having a hierarchy of carrier blocks and each level in the hierarchy of carrier blocks of data constituting topological complexes X, X', X" ..., each of the complexes containing successively more generalized information and the complex containing the most generalized information being the root, each of the complexes constituting topological n-cells, the method being searching from a lesser detailed hierarchical level to the root, comprising the steps of:
   a) initializing a first list of selected cells and a second list of current carrier blocks;
   b) setting the second list of current carrier blocks to a given carrier block;
   c) selecting from the second list of current carrier blocks the n-cells that fall within a specified range of a point;
   d) exiting if the current level is the root to output the first list of selected cells; and
   e) replacing the current carrier blocks in the second list with a single carrier block at the next more generalized level in the hierarchy.

18. Apparatus storing a representation of a topological structure having topological features, comprising:
   a) a data storage medium; and
   b) a digital data base stored on said data storage medium, said digital data base including (i) a plurality of carrier blocks of data representing the topological features at a given level of detail, said data of each one of said carrier blocks of said plurality being a representation of a carrier which is a closed set including in its interior a given topological object, (ii) at least one other carrier block of data being in a hierarchical relationship with respect to said plurality of carrier blocks so as to represent the topological features at another level of detail, said at least one other carrier block representing a complex X' which is topologically equivalent to a complex X represented by said plurality of carrier blocks, and (iii) wherein said at least one other carrier block of said complex X' constitutes an index to said plurality of carrier blocks of said complex X.

19. Apparatus, according to claim 18, wherein a carrier of a carrier block at one level has the same boundary as a corresponding carrier of another carrier block at another level, and only one carrier block representing a carrier has data identifying the same boundary.

20. Apparatus storing a representation of a topological structure having topological features, comprising:
   a) a data storage medium; and
   b) a digital data base stored on said data storage medium, said digital data base including (i) a plurality of carrier blocks of data representing the topological features at a given level of detail, said data of each one of said carrier blocks of said plurality being a representation of a carrier which is a closed set including in its interior a given topological object, (ii) at least one other carrier block of data being in a hierarchical relationship with respect to said plurality of carrier blocks so as to represent the topological features at another level of detail, said at least one other carrier block representing a complex X' which is topologically equivalent to a complex X represented by said plurality of carrier blocks, and (iii) wherein said data of said at least one other carrier block of said complex X' comprises more generalized information than the information of said plurality of carrier blocks of said complex X.

* * * * *